(12) United States Patent
Sun et al.

(10) Patent No.: US 10,504,065 B2
(45) Date of Patent: Dec. 10, 2019

(54) MODELING UTILIZING STAGING ENTITY JOINED WITH COMPENSATION FORMULA TABLE

(71) Applicant: SuccessFactors, Inc., South San Francisco, CA (US)

(72) Inventors: Feng Sun, Boston, MA (US); Amy Dines, Beverly, MA (US); Tatiana Jordan, Denver, CO (US); Ke Chen, Foster City, CA (US); Keqin Liu, Pleasanton, CA (US)

(73) Assignee: SUCCESSFACTORS, INC., South San Francisco, CA (US)

(*) Notice: Subject to any disclaimer, the term of this patent is extended or adjusted under 35 U.S.C. 154(b) by 467 days.

(21) Appl. No.: 15/184,020

(22) Filed: Jun. 16, 2016

(65) Prior Publication Data
US 2017/0221002 A1     Aug. 3, 2017

Related U.S. Application Data

(60) Provisional application No. 62/290,266, filed on Feb. 2, 2016.

(51) Int. Cl.
*G06Q 10/10*     (2012.01)
*G06Q 10/06*     (2012.01)

(52) U.S. Cl.
CPC ..... *G06Q 10/105* (2013.01); *G06Q 10/06398* (2013.01)

(58) Field of Classification Search
CPC ........................ G06Q 10/105; G06Q 10/06398
See application file for complete search history.

(56) References Cited

U.S. PATENT DOCUMENTS

| | | | | |
|---|---|---|---|---|
| 6,014,647 A | * | 1/2000 | Nizzari | G06Q 20/10 705/39 |
| 2005/0192823 A1 | * | 9/2005 | Kuhn | G06Q 10/0639 705/7.42 |
| 2006/0100912 A1 | * | 5/2006 | Kumar | G06Q 40/08 705/4 |
| 2008/0005197 A1 | * | 1/2008 | Chang | G06F 16/84 |

(Continued)

*Primary Examiner* — Sujay Koneru
(74) *Attorney, Agent, or Firm* — Fountainhead Law Group PC

(57) ABSTRACT

An employee compensation modeling approach generates a model from a stored template. The model template may include fields for eligibility rules, performance ratings, guidelines, exchange rates, pay ranges, and other information. A modeling engine then populates that model with specific data from a human resources (HR) database, according to the structure of the template. Examples of HR data stored in an underlying database can include employee names, job codes, pay grades, physical job locations, base salaries, and other compensation-relevant information. The resulting compensation model includes a name, a description, target(s), and other information including allocation(s). The compensation model is displayed on an interface configured to receive further user inputs for purposes of model exploration and/or update. In certain embodiments, the HR database may be an in-memory database, with the template and/or engine also being present within the in-memory database in order to leverage its processing power and storage capacity.

17 Claims, 27 Drawing Sheets

(56) References Cited

U.S. PATENT DOCUMENTS

| | | | | |
|---|---|---|---|---|
| 2009/0254400 A1* | 10/2009 | Lillie | .................... | G06Q 10/063 |
| | | | | 705/7.11 |
| 2010/0076821 A1* | 3/2010 | Hecker | ................. | G06Q 10/06 |
| | | | | 705/7.42 |
| 2010/0100427 A1* | 4/2010 | McKeown | ........... | G06Q 10/067 |
| | | | | 705/322 |
| 2010/0100771 A1* | 4/2010 | Upadhyaya | ............ | G06Q 10/00 |
| | | | | 714/38.1 |
| 2010/0122218 A1* | 5/2010 | Mahadevan | ........... | G06Q 10/06 |
| | | | | 715/853 |
| 2011/0054972 A1* | 3/2011 | Hayden | ................. | G06Q 10/06 |
| | | | | 705/7.42 |
| 2012/0123955 A1* | 5/2012 | Chen | .................... | G06Q 10/105 |
| | | | | 705/320 |
| 2015/0074747 A1* | 3/2015 | Philip | ................ | G06Q 10/0633 |
| | | | | 726/1 |
| 2017/0221002 A1* | 8/2017 | Sun | ...................... | G06Q 10/105 |
| 2017/0316382 A1* | 11/2017 | Colner | .................... | G06Q 40/06 |

\* cited by examiner

FIG. 6A

| COMP_MODEL_GL_FORMULA |
|---|
| COMP_MODEL_GL_ID, |
| COMP_FORMULA_ID, |
| COMP_FORMULA_NAME, |
| COMP_FORMULA_JOB_LEVEL, |
| COMP_FORMULA_PAY_GRADE, |
| COMP_FORMULA_RATING_FROM, |
| COMP_FORMULA_RATING_FROM_INC, |
| COMP_FORMULA_RATING_TO, |
| COMP_FORMULA_RATING_TO_INC, |
| COMP_FORMULA_RATIO_FROM, |
| COMP_FORMULA_RATIO_FROM_INC, |
| COMP_FORMULA_RATIO_TO, |
| COMP_FORMULA_RATIO_TO_INC, |
| COMP_FORMULA_MAX_PER, |
| COMP_FORMULA_MIN_PER, |
| COMP_FORMULA_HIGH_PER, |
| COMP_FORMULA_LOW_PER, |
| COMP_FORMULA_DEF_PER, |
| COMP_FORMULA_USE_PER, |
| COMP_FORMULA_MAX_AMT, |
| COMP_FORMULA_MIN_AMT, |
| COMP_FORMULA_HIGH_AMT, |
| COMP_FORMULA_LOW_AMT, |
| COMP_FORMULA_DEF_AMT, |
| COMP_FORMULA_USE_AMT, |
| COMP_FORMULA_NOTES, |
| COMP_FORMULA_BUDGET_GRP_NAME, |
| COMP_FORMULA_ASSOCIATED_GRP_ID, |
| COMP_FORMULA_FIELD_01_ID, |
| COMP_FORMULA_FIELD_01_VALUE, |
| COMP_FORMULA_FIELD_01_FROM, |
| COMP_FORMULA_FIELD_01_FROM_INC, |
| COMP_FORMULA_FIELD_01_TO, |
| COMP_FORMULA_FIELD_01_TO_INC, |
| COMP_FORMULA_FIELD_02_ID, |
| COMP_FORMULA_FIELD_02_VALUE, |
| COMP_FORMULA_FIELD_02_FROM, |
| COMP_FORMULA_FIELD_02_FROM_INC, |
| COMP_FORMULA_FIELD_02_TO, |
| COMP_FORMULA_FIELD_02_TO_INC, |
| COMP_FORMULA_FIELD_03_ID, |
| COMP_FORMULA_FIELD_03_VALUE, |
| COMP_FORMULA_FIELD_03_FROM, |
| COMP_FORMULA_FIELD_03_FROM_INC, |
| COMP_FORMULA_FIELD_03_TO, |
| COMP_FORMULA_FIELD_03_TO_INC, |
| TOTAL_BASE, |
| TOTAL_COUNT, |
| TOTAL_ALLOCATION, |
| SORT_ORDER |

FIG. 6B

```
- id : long
- name : String
- jobLevelSet : boolean   /* indicates if job level is set */
- jobLevel=WILDCARD : String    /* job level for which the
formula is used */
- payGradeSet=false;   /* indicates if pay grade is set */
- payGrade=WILDCARD;    /* pay grade for which the formula is
used */
- budgetGroupNameSet=false;   /* indicates if budget group
name is set */
- budgetGroupName=WILDCARD;    /* Budget group for which
the formula is used */
- ratingRangeSet=false;   /* indicates if rating range is set */
- ratingFrom=NIL;   /* rating from */
- ratingFromInclusive=true;   /* >= if true, > if false */
- ratingTo=NIL;    /* up to, but not including, i.e. < */
- ratingToInclusive=true;   /* <= if true, < if false */
- ratioRangeSet=false;   /* indicates if ratio range is set */
- ratioFrom=NIL;   /* applicable compa-ratio from and including,
i.e. >= */
- ratioFromInclusive=true;   /* >= if true, > if false */
- ratioTo=NIL;    /* applicable compa-ratio up to, but not
including, i.e. < */
- ratioToInclusive=true;   /* <= if true, < if false */
```
⎫
⎬ 680
⎭

```
- maxPercent=100;   /* max % based on current salary */
- minPercent=0.0;   /* min % based on current salary */
- highPercent=NIL;   /* high % based on current salary */
- lowPercent=NIL;   /* low % based on current salary */
- defPercent=0.0;   /* default % based on current salary */
- usePercent;      /* if use % */
- maxAmount=0.0;   /* max % based on current salary */
- minAmount=0.0;   /* min % based on current salary */
- highAmount=NIL;   /* high amount */
- lowAmount=NIL;    /* low amount */
- defAmount=0.0;   /* default % based on current salary */
- useAmount;      /* if use $ */
```
⎫
⎬ 682
⎭

```
- notes=null;     /* notes for other info */
- customCriteria : List<CompFormulaCustomCriteriaBean>
```

+ isRatioMatched()
+ isRatingMatched()
+ isCustomCriteriaMatched()

Screen of FIG. 19

MODELING UTILIZING STAGING ENTITY JOINED WITH COMPENSATION FORMULA TABLE

CROSS-REFERENCE TO RELATED APPLICATION

The instant nonprovisional patent application claims priority to the U.S. provisional patent application No. 62/290,266 filed Feb. 2, 2016, which is incorporated by reference in its entirety herein for all purposes.

BACKGROUND

Unless otherwise indicated herein, the approaches described in this section are not prior art to the claims in this application and are not admitted to be prior art by inclusion in this section.

Embodiments relate to employee compensation, and in particular to apparatuses and methods implementing compensation modeling.

Prior to commencing an annual compensation planning process, enterprises may go through a rigorous analysis in order to determine how compensation should be awarded to employees. This process can be complex, depending upon factors such as job location, performance levels, positions in range, etc.

Moreover, the awarded compensation itself may comprise a variety of components, such as merit increases, incentive bonuses, and equity. Finally, every organization has a different method of conducting this process of awarding compensation, weighing different considerations as part of the analysis being performed.

SUMMARY

An employee compensation modeling approach generates a model from a stored template. The model template may include fields for eligibility rules, performance ratings, guidelines, exchange rates, pay ranges, and other information. A modeling engine then populates that model with specific data from a human resources (HR) database, according to the structure of the template. Examples of HR data stored in an underlying database can include employee names, job codes, pay grades, physical job locations, base salaries, and other compensation-relevant information. The resulting compensation model includes a name, a description, target(s), and other information including allocation(s). The compensation model is displayed on an interface configured to receive further user inputs for purposes of model exploration and/or update. In certain embodiments, the HR database may be an in-memory database, with the template and/or engine also being present within the in-memory database in order to leverage its processing power and storage capacity.

Particular embodiments utilize a staging entity to store employment-relevant data on a per-employee basis. Base compensation information for each employee is stored in the staging table, together with one or more job attributes of the employee. Referencing the job attributes, a model guideline formula is assigned to each employee and utilized to calculate a per-employee compensation allocation (from the base salary). Aggregating the per-employee allocation results in a total compensation allocation by the model. Operation of the model is rendered flexible and efficient by assigning common guideline formulas to multiple employees, and/or by reassigning guideline formulas within the staging table to explore model parameters under different conditions. Recommendations for compensation changes may be afforded by comparing the model with a target sharing one or more of the attributes in the staging table. A successful model may be pushed down into the database for republication as a template, serving as a basis for further model development and/or implementation of a specific compensation plan.

An embodiment of a computer-implemented method comprises providing a database comprising information of a plurality of users, and populating a staging entity of a model with a subset of the information comprising a per-user base value and per-user attribute values. Based upon the per-user attribute values, each user in the staging entity is assigned a respective guideline from a guideline table. The respective guideline is applied to the per-user base value to generate a per-user allocation. In response to an input provided to the model, a value of the respective guideline is changed of one of the users in the staging entity. The respective guideline with the changed value is applied to the per-user base value to generate an updated per-user allocation, and the staging entity is stored with the updated per-user allocation.

A non-transitory computer readable storage medium embodies a computer program for performing a method comprising, providing a database comprising information of a plurality of users, and populating a staging entity of a model with a subset of the information comprising a per-user base value and per-user attribute values. Based upon the attribute values, each user in the staging entity is assigned a respective guideline from a guideline table, and the respective guideline is applied to the per-user base value to generate a per-user allocation. In response to an input provided to the model, a value of the respective guideline of one of the users in the staging entity is changed. The respective guideline with the changed value is applied to the per-user base value to generate an updated per-user allocation, and the staging entity is stored with the updated per-user allocation.

An embodiment of a computer system comprises one or more processors and a software program executable on said computer system. The software program is configured to cause an in-memory database engine to provide an in-memory database comprising information of a plurality of users, and populate a staging entity of a model with a subset of the information comprising a per-user base value and per-user attribute values. Based upon the attribute values, each user in the staging entity is assigned a respective guideline from a guideline table. The respective guideline is applied to the per-user base value to generate a per-user allocation. In response to an input provided to the model, a value of the respective guideline of one of the users in the staging entity is changed. The respective guideline with the changed value is applied to the per-user base value to generate an updated per-user allocation, and the staging entity is stored with the updated per-user allocation.

Certain embodiments further comprise aggregating the per-user allocation for multiple users with the same guideline to create a per-guideline allocation, and displaying the per-guideline allocation.

Some embodiments further comprise aggregating the multiple users with the same respective guideline to create a per-guideline count, and displaying the per-guideline count.

According to particular embodiments the input is made to the per-guideline allocation being displayed.

Various embodiments further comprise aggregating the per-guideline allocation for multiple guidelines to create a total allocation.

Certain embodiments further comprise determining a difference between the total allocation and a target of a target entity, and displaying the difference.

In some embodiments the target references the attribute value and the method further comprises generating a recommendation to change the model based upon the per-guideline allocation, wherein the input comprises an acceptance of the recommendation.

According to some embodiments the recommendation is to change a plurality of respective guidelines evenly to produce the difference.

In particular embodiments the staging entity is based upon metadata provided by a parent template, and the method further comprises modifying the parent template to include the changed guideline value.

In various embodiments the staging entity is stored in an in-memory database, and an engine of the in-memory database applies the respective guideline to the per-user base value to generate the per-user allocation.

The following detailed description and accompanying drawings provide a better understanding of the nature and advantages of embodiments.

BRIEF DESCRIPTION OF THE DRAWINGS

FIGS. 6-6B show aspects of a class diagram for a modelling engine according to an embodiment.

FIGS. 20-21 show additional screenshots of an embodiment of an interface for employee compensation modeling according to an example.

DESCRIPTION

Described herein are methods and apparatuses for implementing compensation modeling. In the following description, for purposes of explanation, numerous examples and specific details are set forth in order to provide a thorough understanding of the present invention. It will be evident, however, to one skilled in the art that embodiments of the present invention as defined by the claims may include some or all of the features in these examples alone or in combination with other features described below, and may further include modifications and equivalents of the features and concepts described herein.

An employee compensation modeling approach generates a model from a stored template. The model template may include fields for eligibility rules, performance ratings, guidelines, exchange rates, pay ranges, and other information. A modeling engine then populates that model with specific data from a human resources (HR) database, according to the structure of the template. Examples of HR data stored in an underlying database can include employee names, job codes, pay grades, physical job locations, base salaries, and other compensation-relevant information. The resulting compensation model includes a name, a description, target(s), and other information including cost(s). The compensation model is displayed on an interface configured to receive further user inputs for purposes of model exploration and/or update. In certain embodiments, the HR database may be an in-memory database, with the template and/or engine also being present within the in-memory database in order to leverage its processing power and storage capacity.

Figure 1:
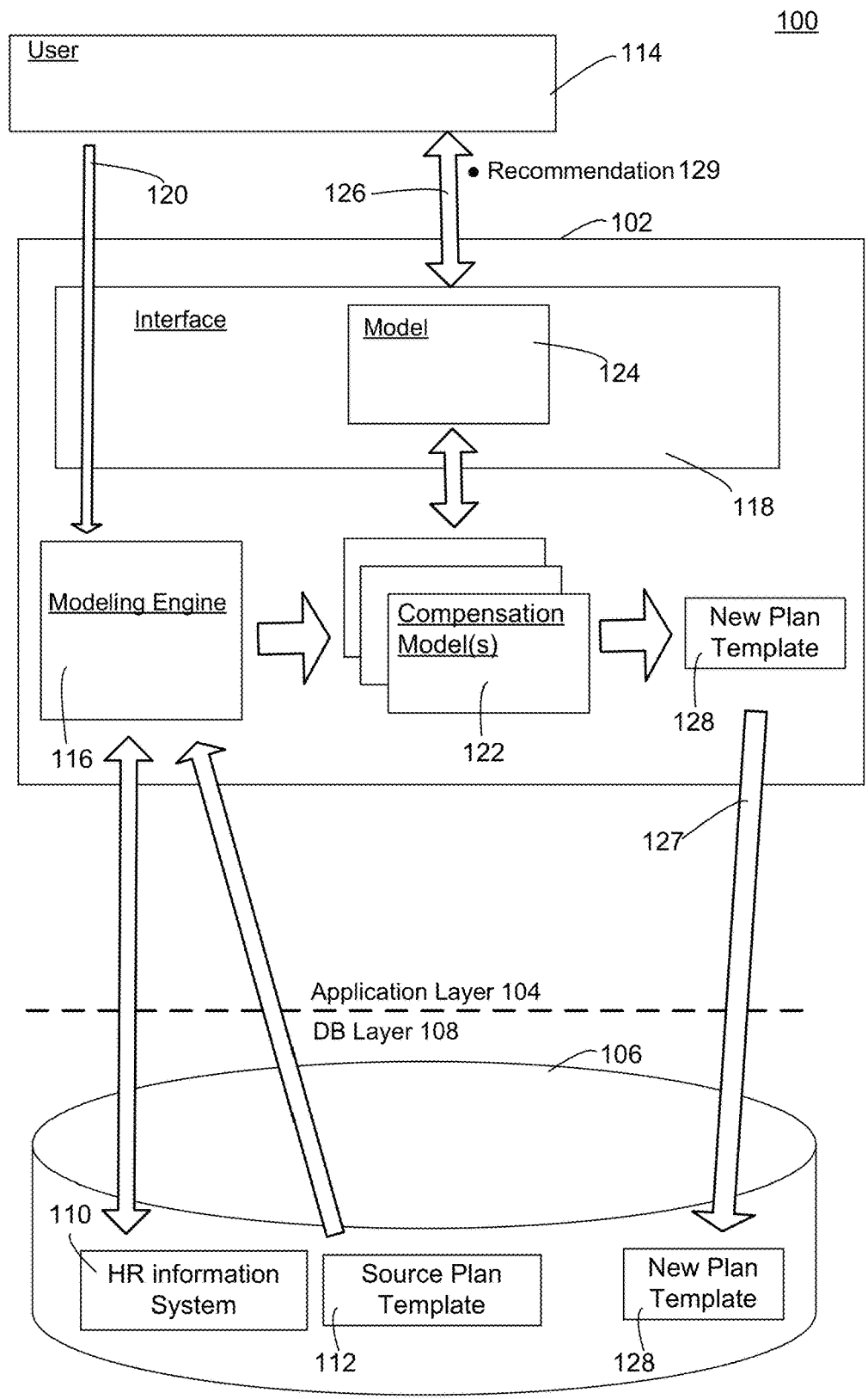
FIG. 1 shows a simplified view of a system according to an embodiment.

FIG. 1 shows a simplified view of a system 100 according to an embodiment. In particular, a compensation application 102 of an application layer 104, is in electronic communication with a database 106 of an underlying database layer 108.

The database 106 includes data of a human resources system 110. This can include information such as employee names, job codes, pay grades departments, divisions, physical locations, base salary, and other data potentially relevant to determining compensation for a particular employee. For example, employee physical location data may be relevant to compensation based upon issues such as cost of living, currency, and/or amounts of vacation time dictated by national laws.

The database also includes a source plan template 112. That source plan template can include eligibility rules, performance rating methodologies, guidelines, currency exchange rates, pay ranges, and other data potentially relevant to calculating compensation according to a particular model.

A user 114 is in communication with modeling engine 116 of the compensation application via interface 118. In particular the user provides input 120 to the engine, which results in the generation of compensation model(s) 122 from the source plan template including various fields and guidelines thereof, and the population of those model(s) with relevant specific HR information.

Based on the user input, a particular model 124 is selected by the engine and communicated to the interface for display to the user. The compensation model(s) include a model name, a description of the model, and model targets. One interface view showing such a model, is provided in the screenshot of FIG. 2 that is discussed below in connection with a particular example.

Based upon further interaction 126 between the user and the compensation modeling application occurring via the interface, the user may view, edit, and update the compensation model(s). The modeling engine may perform the calculations involved in these types of activities. Such user interactions with a model are further illustrated in the exemplary screenshots of the example described below.

According to certain embodiments, the modeling engine may generate and return to the user via the interface, specific recommendations 129. Those recommendations can comprise, for example, suggested changes to compensation that can serve to align guidelines with budget targets (e.g., budget) of the model.

The recommendations can include suggested changes affecting a plurality of compensation guidelines to achieve the desired effect. The recommendations can also include suggested changes affecting particular guidelines only, in order to focus the resulting impact.

These recommendations may be expressed as percentage changes, and/or as raw values (e.g., monetary amounts). The interface may use affordances such as color (i.e., red for an amount over the target) to impart recommendation information to the user.

As further discussed below in connection with the example, additional interaction between the user and the interface may be based upon the initial recommendations provided. For example, the user can accept the recommendation, with corresponding resulting adjustment of the model. Alternatively, the user can adjust a target, with updated recommendation(s) calculated by the engine then being provided to the interface for user review and/or selection.

The user may also instruct the compensation modeling application to store 127 a model as a new plan template 128 for future reference in modeling compensation issues. This is also shown and described in the example discussed below.

While FIG. 1 shows the source plan template and the HR information as being stored within the same underlying database, this is not required. In various embodiments the template could be stored with, or separately from, the HR data.

Also, while FIG. 1 shows the modeling engine as being present in the application layer overlying the database, this is also not required. In certain embodiments the modeling engine could be implemented as part of the database layer, for example to leverage the processing power available to an in-memory database engine (e.g., the HANA in-memory database available from SAP SE of Walldorf, Germany).

As mentioned above, compensation modelling may operate based upon data volumes that are large and diverse. Such data can include a variety of different types (e.g., performance rating, job location, national currency of salary, base salary, merit pay percentage, job promotion, retirement benefits, and many others), with each applied to the individual employees belonging to an enterprise or department thereof.

Embodiments facilitate efficient and rapid manipulation of employee compensation models, by allocating data to various levels affording different characteristics, such as access speed and ease of implementing data changes for propagation within the model. The various data levels within a model are shown in FIG. 2.

Figure 2:
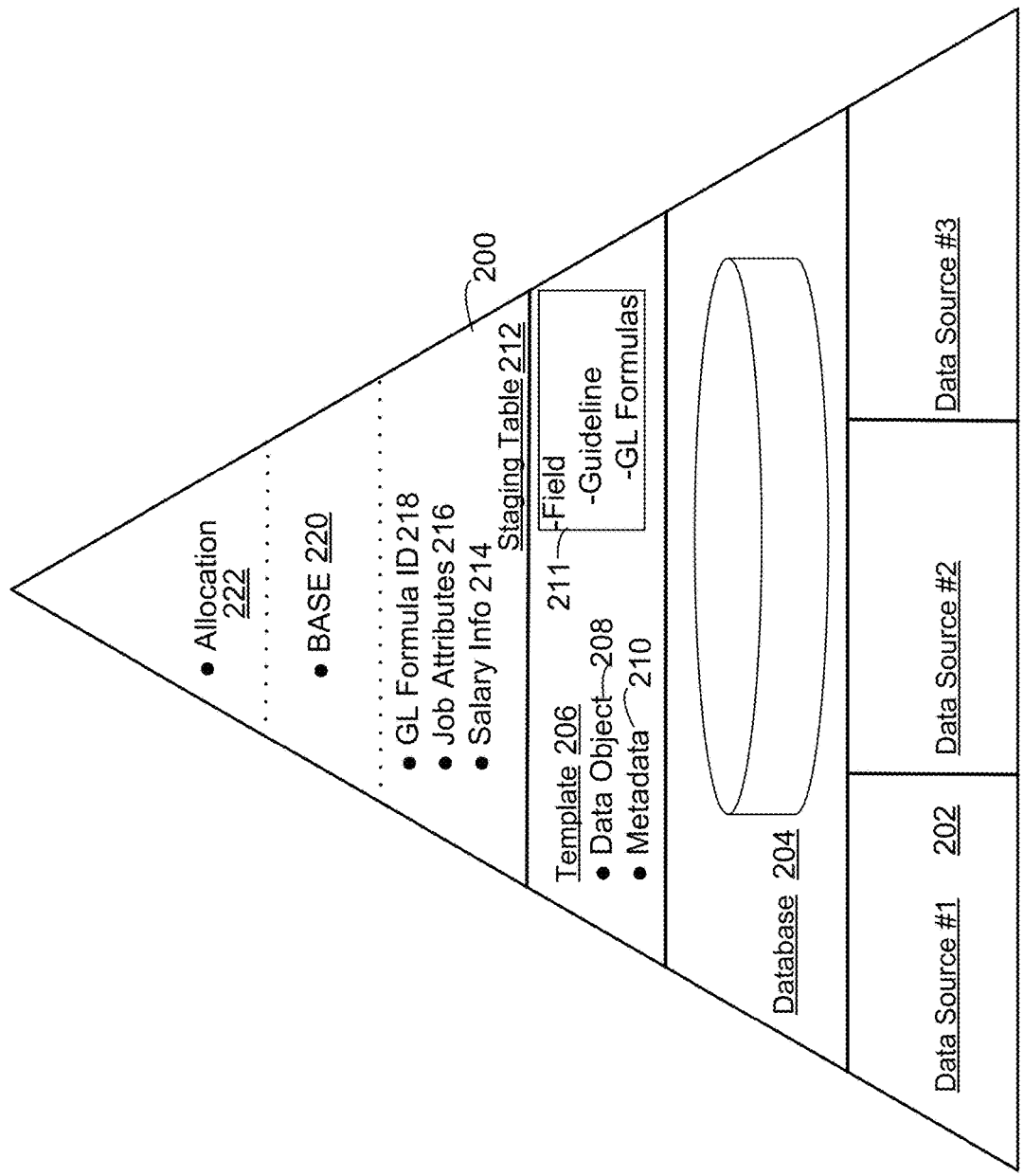
FIG. 2 is a simplified view showing the allocation of data in a compensation model according to an embodiment.

In particular, FIG. 2 shows the data of compensation model as being arranged in a pyramid 200. The bottom of the pyramid comprises original data of employees, as may be stored in various sources 202 such Enterprise Resource Planning (ERP) and other platforms which may be available from different third party vendors.

The next layer of the pyramid comprises a database 204 in which data relevant to employee compensation from the various sources is compiled and stored. In certain embodiments this database may be implemented as an in-memory database (e.g., the HANA database available from SAP SE), with data being stored in Random Access Memory (RAM), rather than apportioned between different disk media.

Data present at this database level represents the raw data serving as the basis for the modeling activities. However, the sheer volume of the data present in the database may preclude its frequent access and updating for modeling type purposes.

The next layer of the pyramid comprises a template 206, in which certain data of the database is organized into larger data objects 208 including metadata 210. A template data structure 211 may comprise a field (e.g., for merit compensation, for promotion compensation, or for adjustment compensation), with each field including one or more guidelines (GL), and each guideline comprising one or more guideline (GL) formulas.

Again, however, the high volume of data and metadata present at this template level discourages frequent data changing/updating associated with model exploration, due to the need to propagate data changes amongst a large number of data objects related according to the template.

Thus in order to facilitate the handling of employee compensation data for modeling purposes, the next layer of the pyramid comprises a staging table 212. The staging table includes a subset of selected salary information 214, job attributes 216, and specific guideline formula identifiers 218. These identifiers serve as pointers to formulas that are relevant to a particular set of users who are represented in the staging table. These are applied to calculate a per-user contribution to a total compensation cost.

The staging table further includes a BASE 220 comprising a fixed set of compensation parameters that are not varied in order to simplify calculations and increase speed. Finally, the staging table includes an allocation 222 representing the cost-per-user to the overall compensation value. The various components of the staging table are further illustrated in connection with an example.

Figure 3:
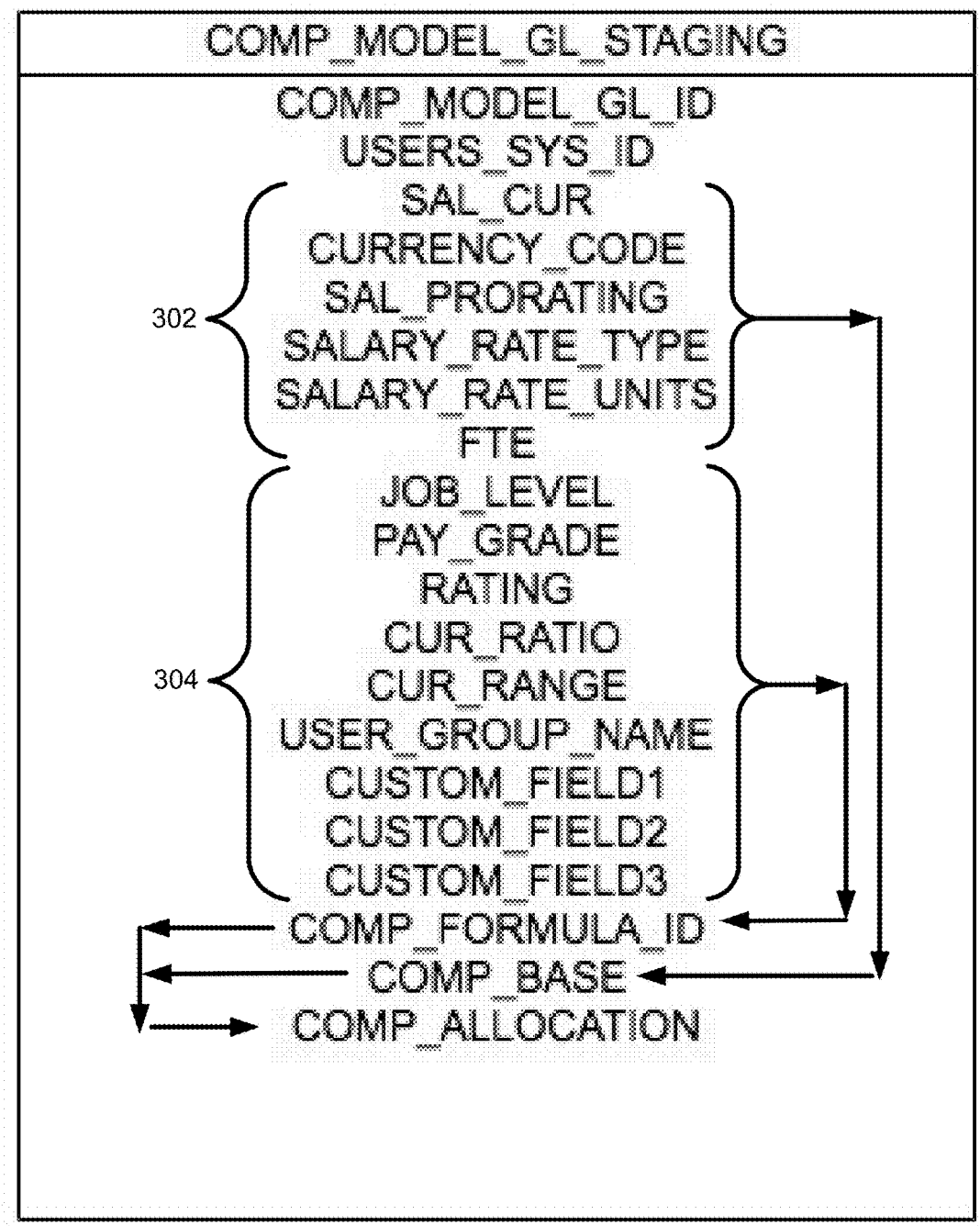
FIG. 3 shows an example of the allocation of data in a staging table.

Specifically, FIG. 3 shows an Entity Relationship Diagram (ERD) for one example of a staging entity comprising table 300 "COMP_MODEL_GL_STAGING". This staging table comprises rows corresponding to each of the plurality of individual users whose compensation is being modelled.

FIG. 3 lists the columns of the staging table. Here, the column "COMP_MODEL_GL_ID" uniquely identifies the compensation model itself. The column "USERS_SYS_ID" uniquely identifies the individual user (i.e., the employee) of a particular row.

The next six columns of the staging table 300 (i.e., SAL_CUR through FTE—"Full Time Equivalent") provide details of the particular user's compensation 302. For example, SAL_CUR indicates the employee's current salary, CURRENCY_CODE indicates the national currency in which the salary is paid, etc.

This salary information is processed in a per-user manner by the model according to a specific guideline formula (discussed below). Application of the formula provides an allocation of the cost of the individual user's contribution to the overall compensation in the model.

The next nine columns of the staging table 300 (i.e., JOB_LEVEL through CUSTOM_FIELD3) provide details regarding the particular user's employment 304 that may influence compensation. For example, the attribute JOB_LEVEL indicates the amount of responsibility associated with the position, while the PAY_GRADE attribute may indicate a correlation between the position and a range of possible salaries.

As previously indicated, the contribution of the user's compensation to an overall compensation cost, may be calculated by the applying a guideline formula to data within the staging table. The guideline formula assigned to each user (row) is specifically identified by the COMP_FORMULA_ID column of the staging table. This identifier serves as a pointer to specific guideline formulas stored in a separate guideline formula table that is referenced by the staging table.

Assigning groups of users to the same guideline formula within the staging table, may substantially increase the efficiency and speed of data access for exploring the compensation model. This process for assigning the guideline formula to users, is discussed later below in connection with FIG. 7.

The next column of the staging table is COMP_BASE. This BASE compensation represents a consolidation of the salary data (i.e., of columns 3-8 of the staging table) for each user. Pre-calculating the BASE according to relatively static salary measures (such as current salary, national currency, Full Time Equivalence—FTE, Rate Unit, etc.,) reduces a computational burden as the modelling engine applies the guideline formula to calculate the per-user cost allocation.

The last column of the staging table (COMP_ALLOCATION) represents this per-user allocation. This ALLOCATION field represents the application of the guideline formula to the BASE for a particular user in a row of table 300. Because the BASE is essentially unchanging, the ALLOCATION calculation is essentially determined by the guideline formula that is selected and applied. This imparts flexibility to the calculation of the per-user allocation, allowing that value to be changed and updated relatively quickly by a modeler, facilitating iterative exploration of various compensation options via the model.

Figure 4:
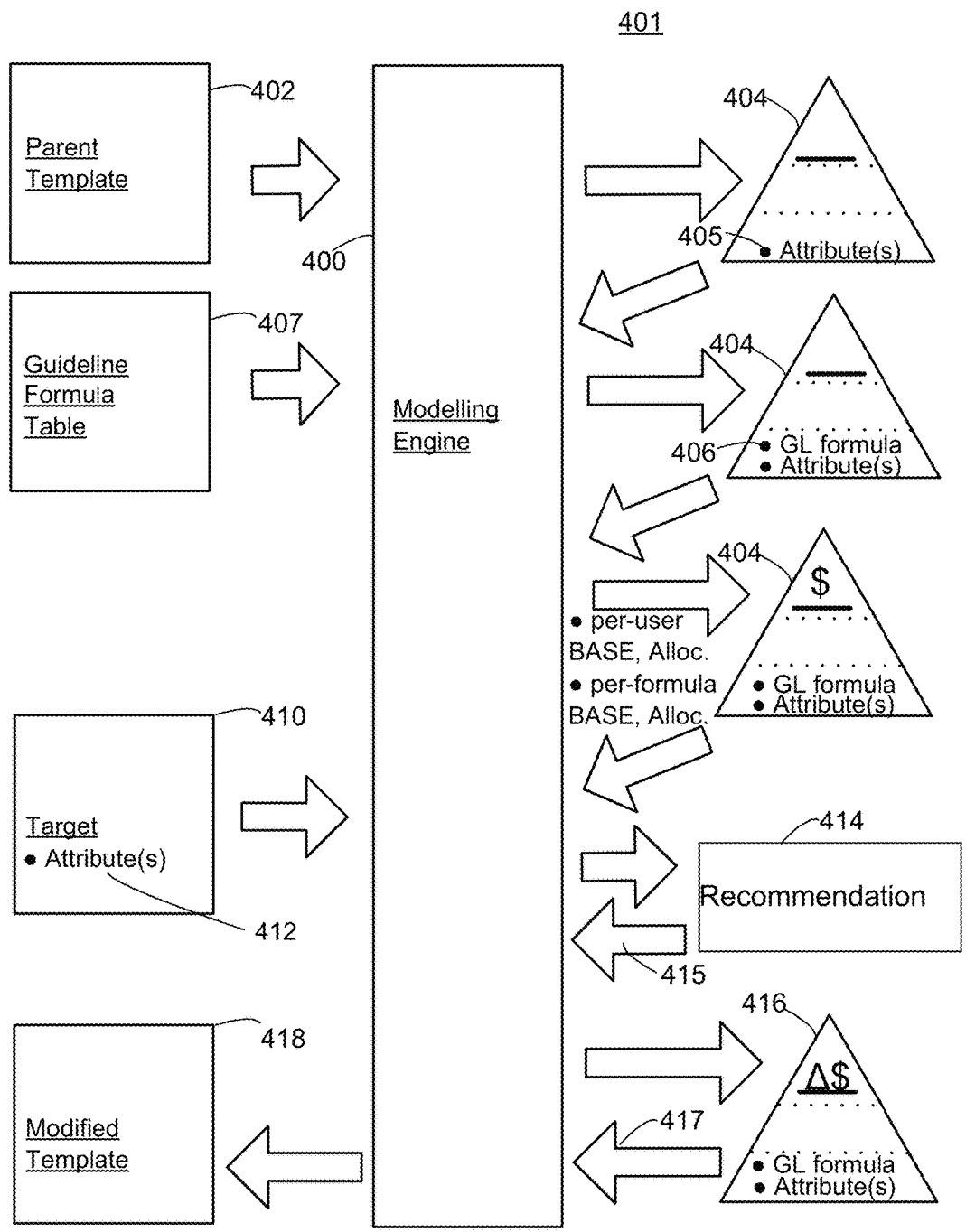
FIG. 4 is a simplified view showing the operation of the modeling engine.

FIG. 4 is a simplified view further illustrating the role of the modeling engine 400 in various stages of the compensation modeling process 401. In particular, modeling engine 400 first receives a parent template 402 as an input.

The engine processes the parent template according to stored compensation data to create the model including a staging table 404. That staging table includes one or more attributes 405 as has been described above.

In a next stage, the engine processes the staging table and the attributes according to a procedure. As a result of this processing, the engine assigns to each user a guideline formula 406 from a guideline formula table 407, thereby populating the staging table 404 with GL formulas. The GL formula assignment process is described further below in connection with FIG. 7.

In a next stage, the modelling engine processes the contents of the staging table to generate a per-user BASE and per-user allocation as has been described above, resulting in the staging table 404 including updated information. The modelling engine may further process the information of the updated staging table to generate a count of the number of users assigned to the same guideline formula, and a per-formula BASE and allocation.

By this point in the process, the model including the updated staging table has been created and has generated compensation data useful for iterative exploration. A modeler, however, may consider it useful to further compare the characteristics of the model to desired targets.

Accordingly, in a further stage of the process the engine may next receive a target 410 as an input. This target typically comprises an overall compensation budget, and is also structured to include one or more of the same attributes 412 that are in the staging table 404.

This commonality in attribute(s) between the staging table and the target, allows the model to display the relationship between the model allocation and a target, on a total basis and also on a per-attribute basis.

Moreover, the attribute values of the model and target may be compared by the engine to generate one or more recommendations 414. Specifically, the engine may examine each attribute separately, to provide a recommendation to change the model in order to meet the target. The engine may also consider the attributes as a group, recommending even changes across attributes in order to achieve the target. The recommendation process is described further below in connection with FIG. 20.

Once generated, the recommendation 414 offers an input 415 to the engine, allowing the guideline formula table to be changed according to the recommendation.

Specifically, acceptance of the recommendation results in the engine effecting a change in the values of GL formulas within the formula table of the model, and a re-calculation of the BASE and allocation values to produce a changed staging table 416.

The changed formula table can serve as an input 417 to the engine. That is, once the modeler has become satisfied with the model with changed GL formula values, the staging table referencing the updated guideline formulas is used to calculate the model and the modeler is updated with the new model information. The modeler may then push the model back down to the template level to result in a modified template 418.

Figure 5:
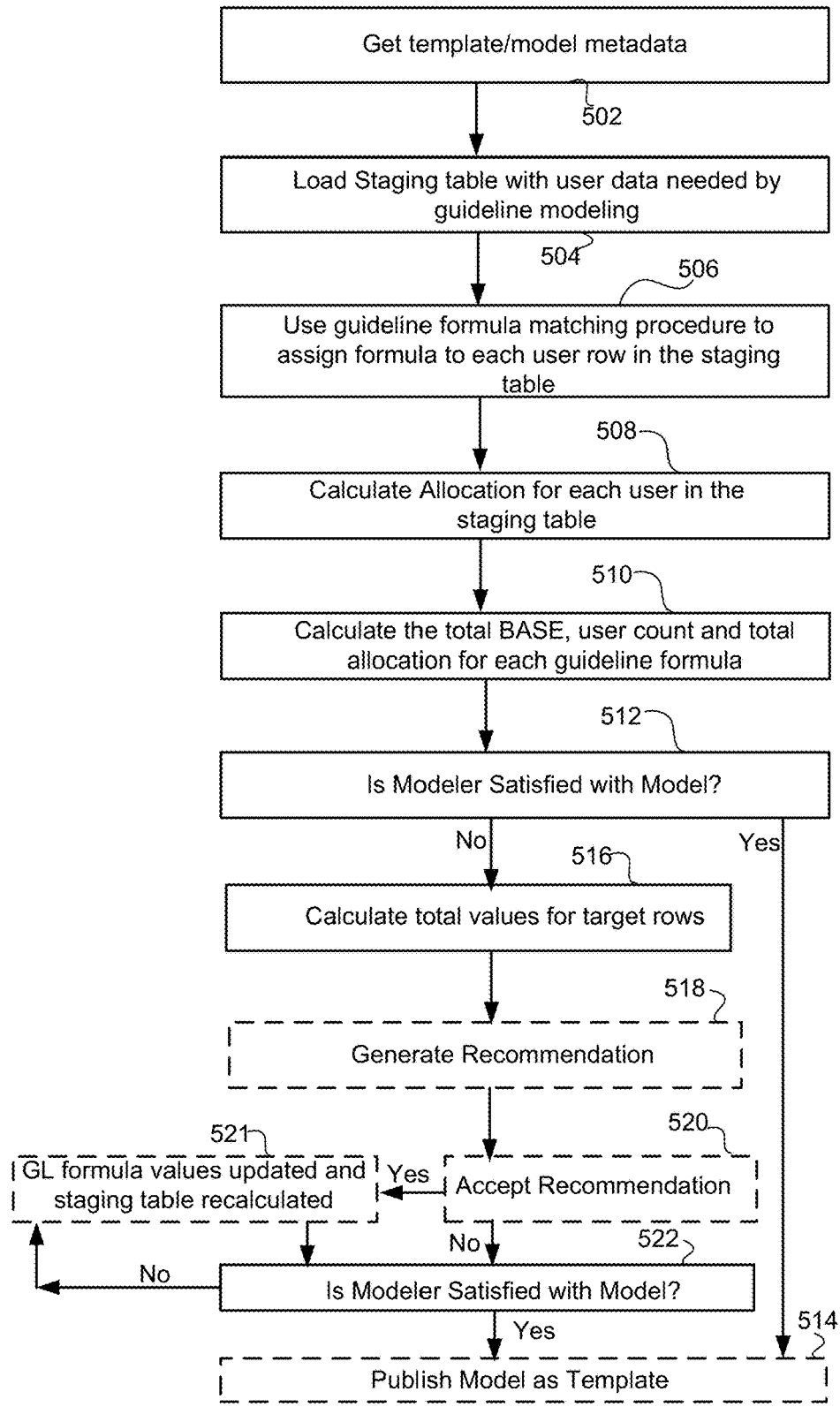
FIG. 5 is a simplified flowchart of a method according to an embodiment.

FIG. 5 is a simplified flow diagram 500 summarizing steps that may be performed according to an embodiment. This figure shows how the backend modeling engine works for calculating the model based on modeling user data and model setup. This is the core backend engine of modeling approaches.

At 502, template model/metadata are obtained. At 504, a staging table is loaded with user data needed by guideline modeling. Such user data may include the salary information and job attributes as described previously.

At 506, a guideline formula matching procedure is used to assign a formula to each user row in the staging table. This assignment of common formulas to individual users may streamline data handling by grouping similarly-compensated users together, and is discussed in detail below in connection with FIG. 7.

At 508, the per-user BASE is calculated from the salary information, and the per-user guideline formula is applied to this per-user BASE in order to calculate the per-user ALLOCATION. These per-user quantities are stored in the staging table.

At 510, the total BASE, user count, and total allocation for each guideline formula are calculated and stored in the model. At this point, the model is complete.

At 512, it is determined whether the modeler is satisfied with the model. If the modeler is satisfied, the model may be pushed down to the template layer for publication as a modified template to implement a compensation plan at 514.

If the user is not satisfied with the model, she may undertake further activity, for example comparison with a target. For example, at 516, total values for target rows can be calculated.

At 518, a recommendation may be generated by comparing the model to the target. At 520, if the recommendation is accepted, then at 521 the corresponding guideline formulas included from the recommendation action will be updated with the new recommended values.

The modeling engine is then able to readily recalculate allocations in the staging table based upon the latest GL formula values. This ability to rapidly explore compensation allocations based upon changes to guideline formula values referenced by the staging table, imparts desirable flexibility and responsiveness. That is, the compensation modeling system can quickly return feedback to the user regarding the impact of varying compensation input parameters.

At 522 it is again determined whether the modeler is satisfied with the model. If so, then the process flow proceeds to publication at 514.

If the modeler remains unsatisfied with the state of the model, he or she can utilize the user interface to return at 521 to the guideline formula list and change values in the guideline formula table until satisfied.

Figure 6:
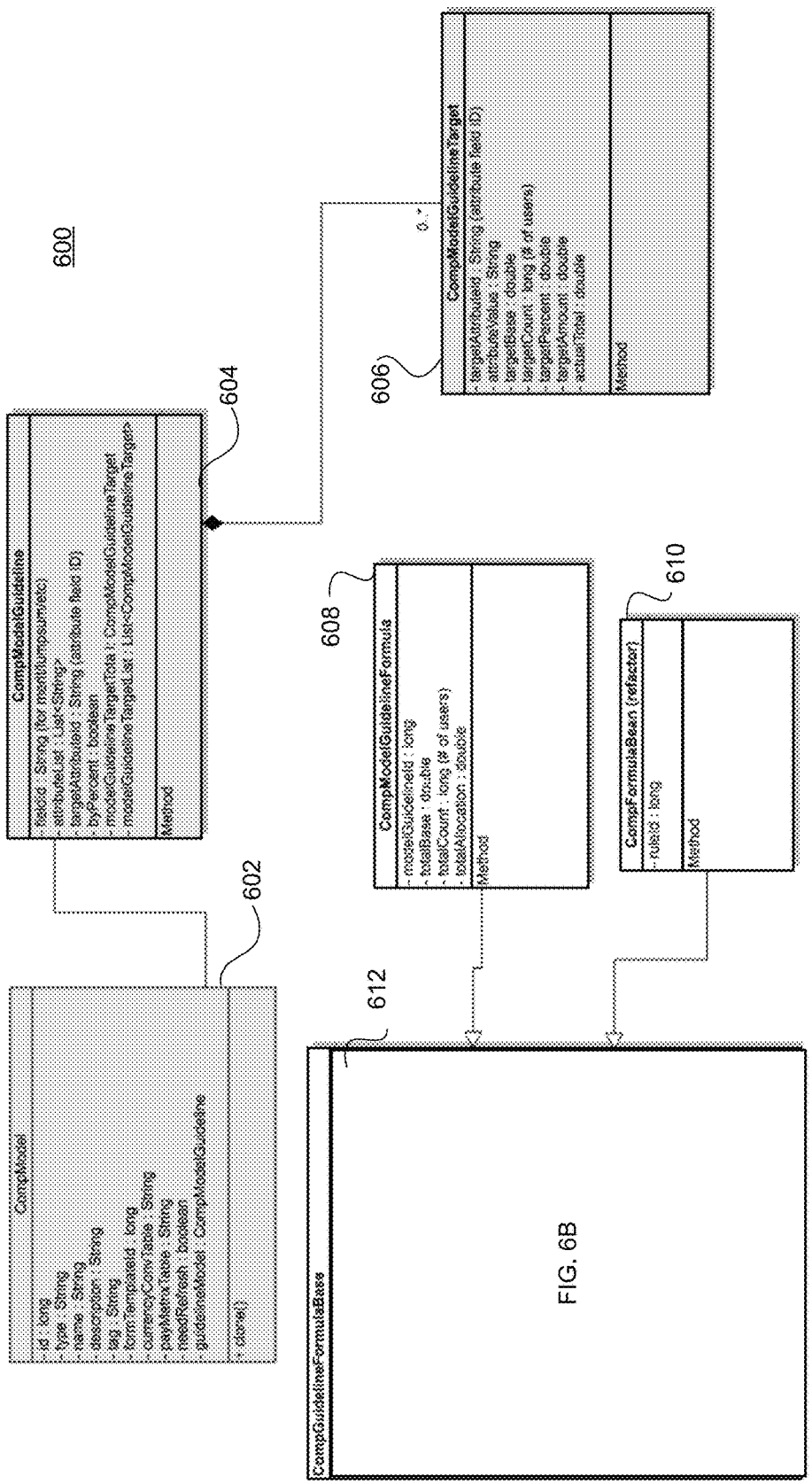

FIG. 6 is a class diagram 600 showing each of the classes designed for the modeling engine. This class diagram describes how the data and metadata of the modeling engine is defined and stored in the system. Here, the classes 602, 604, and 606 are organized according to a MetaData Framework (MDF) table format as employed by SuccessFactors™.

For example, FIG. 6 shows the CompModel class 602. This class describes how a compensation model is defined in the system, spelling out the metadata of a Comp Model object stored in the database.

FIG. 6 also shows the CompModelGuideline class 604. This class describes how guideline related information is defined for a model, spelling out the specific guideline related metadata of a model.

The class diagram of FIG. 6 also describes relationships between each class/object. For example, a CompModel object references a CompModelGuideline object.

The CompModelGuidelineTarget 606 of FIG. 6, defines the guideline target metadata setup of a guideline model. A CompModelGuideline can have 0 to many CompModelGuidelineTarget. As described above, this target object includes target attribute(s) allowing for comparison and the generation of recommendations.

FIG. 6 further shows the CompModelGuidelineFormula class 608 and CompFormulaBean (refactor) class 610 in communication with the CompGuidelineFormulaBase class 612. These classes 608, 610, and 612 are not specific to the MDF format.

The CompModelGuidelineFormula class 608 defines a formula of a guideline formula in a Guideline Model. The CompModelGuidelineFormula class 608 may be represented at the database level as a table with rows representing the different guideline formulas that may be assigned to various users, and columns representing the structure of those guideline formulas.

Here the guideline formulas are stored in a specific database table titled: COMP_MODEL_GL_FORMULA. FIG. 6A is an ERD of the COMP_MODEL_GL_FORMULA table of the CompModelGuidelineFormula class 608.

Here, the first table column (COMP_MODEL_GL_ID) represents an identifier of the particular compensation model in which the formula is used. The second column (COMP_FORMULA_ID) represents an identifier of the particular formula. The third column (COMP_FORMULA_NAME) represents a name of the particular formula.

The succeeding columns of the formula table, then mirror the particular job attributes listed in the staging table of FIG. 3, i.e.

JOB_LEVEL
PAY_GRADE
RATING
RATIO
RANGE (MAX/MIN/HIGH/LOW/DEFAULT)
GROUP and concluding with:
BASE
ALLOCATION.

It is noted that the COMP_MODEL_GL_FORMULA entity of FIG. 6A, further includes a column for ●TOTAL_COUNT. As noted above, multiple users may be assigned the same formula in order to ease processing burden for modeling purposes. Hence, this "count" column in the formula table indicates the number of users who have been assigned that particular formula.

This "count" column may be referenced by the target. For example, returning to FIG. 6, the CompModelGuidelineTarget object includes "targetBase" and "targetCount", as components.

The CompFormulaBean class 610 of FIG. 6, is used by a compensation plan template. A compensation plan template may have zero to many Comp Models. A model must be created from an existing Comp Plan template. The CompFormulaBean (refactor) class 610 provides custom criteria for the application of a guideline formula to the base FIG. 6 shows both the CompFormulaBean class 610 and CompModelGuidelineFormula class 608 as inheriting/extending from CompGuidelineformulaBase class 612. That CompGuidelineFormulaBase is a base class that is shared by both CompModelGuidelineFormula and CompFormulaBean. It defines those common properties that can be shared by classes 608 and 610.

FIG. 6B defines the properties of a guideline formula of the base class 612, describing details of metadata/data of that guideline formula. For example, "id" represents a unique identifier of the guideline formula. "Name" is the name that is readable to a user for the guideline formula.

In FIG. 6B the entries 680 "jobLevel" to "ratioToInclusive" (and also "customCriteria"), describe formula/formula values used by a guideline formula. In a simple example, this guideline formula can be defined for jobLevel "L10", if only jobLevel is used as an attribute in the guideline setup.

In FIG. 6B the entries 682 from "maxPercent" to "useAmount" describe how the guideline formula is going to be used. For example, it can specify that if this formula is used, the guideline range is from 3% to 5% and the default % can be 4%.

It is noted that FIG. 6 does not show the staging table class. Such a staging table class would be named: "CompModelGuidelineStaging", whose actual staging table definition is shown in the ERD FIG. 3. There would be a 1:1 relationship between the CompModelGuideline and CompModelGuidelineStaging classes.

As mentioned previously, the per-user allocation calculation is simplified through the application of the guideline formulas. The procedure for assigning specific guideline formulas in the staging table to the individual users, can significantly enhance the efficiency of handling compensation data for modeling purposes.

In particular, assigning common guideline formulas to a plurality of users, serves to group those users together having common salary information and job attributes (e.g., handling large numbers of low-level employees with similar salary demands). The procedure by which the formulas may be assigned to users in the staging table, is now described.

Figure 7:
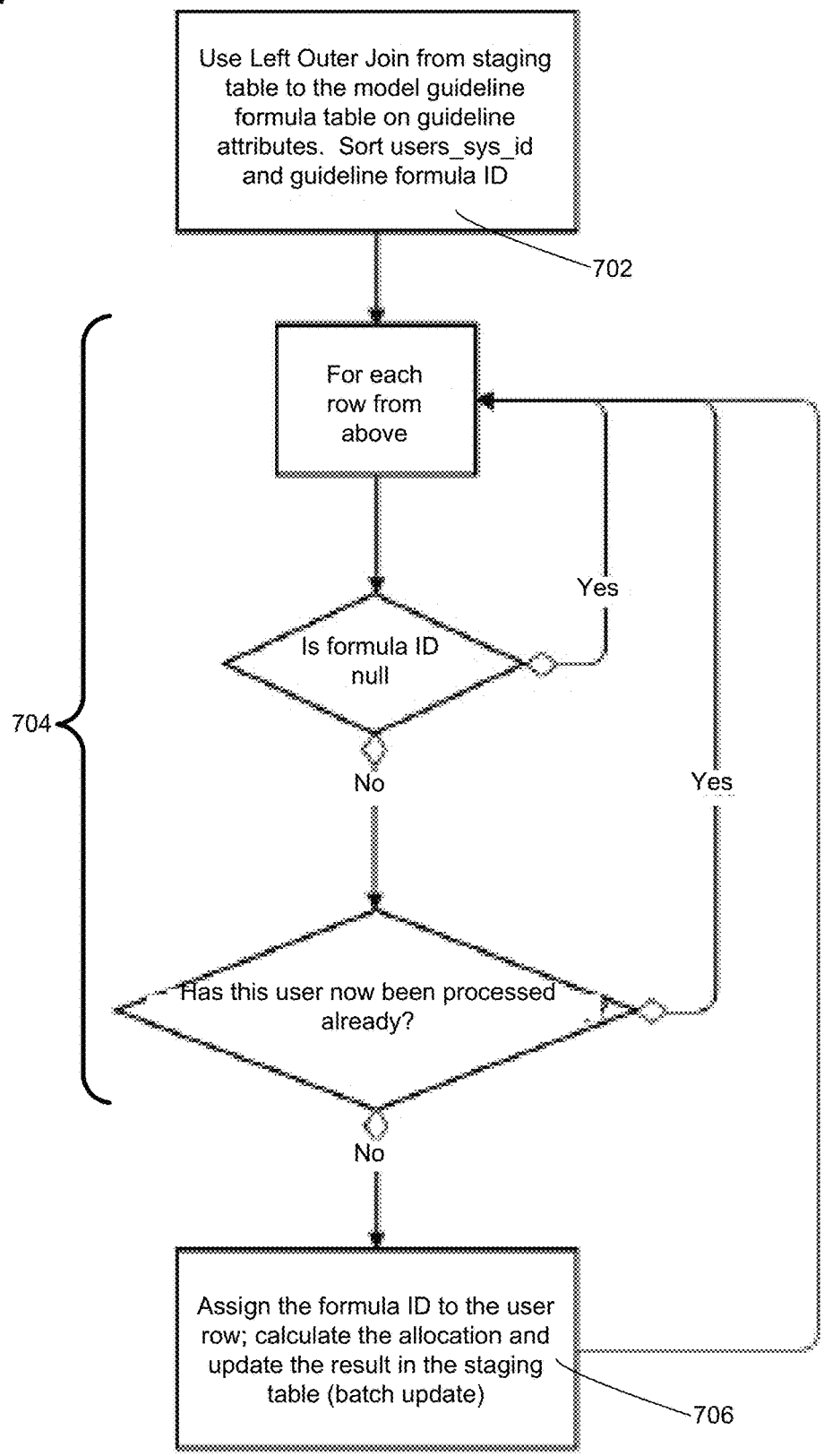
FIG. 7 provides a flow diagram illustrating a procedure for assigning formulas to users in a staging table.

FIG. 7 shows a procedure 700 providing details regarding the guideline formula matching procedure assigning formulas to each user in the staging table.

Procedure 700 serves to assign a guideline formula to a staging table from a guideline formula table. The following shows a simplified staging table in an example:

| User ID | BASE (USD) | Country | Job Code | Formula ID |
|---------|------------|---------|----------|------------|
| Amy     | 40,000     | USA     | J2       |            |
| Bob     | 32,000     | Canada  | J1       |            |
| Cathy   | 42,000     | UK      | J3       |            |
| Dan     | 35,000     | China   | J1       |            |

The following shows a simplified guideline formula table in the example:

| Formula ID | Country | Job Code | Default % |
|------------|---------|----------|-----------|
| 1          | USA     | J1       | 4         |
| 2          | USA     | J2       | 5         |
| 3          | Canada  | J1       | 4         |
| 4          | Canada  | J2       | 4         |
| 5          | *       | J1       | 3         |
| 6          | *       | J2       | 5         |
| 7          | *       | *        | 2         |

Here, an asterisk (*) indicates a wild card.

At 702, a Left Outer Join is applied from the staging table to the model guideline formula table on guideline attributes. Sorting by USER ID and Formula ID results in the following table populated with assigned guideline formulas.

| User ID | Country | Job Code | Formula ID |
|---------|---------|----------|------------|
| Amy     | USA     | J2       | 2          |
| Amy     | USA     | J2       | 6          |
| Amy     | USA     | J2       | 7          |
| Bob     | Canada  | J1       | 3          |
| Bob     | Canada  | J1       | 5          |
| Bob     | Canada  | J1       | 7          |
| Cathy   | UK      | J3       | 7          |
| Dan     | China   | J1       | 5          |
| Dan     | China   | J1       | 7          |

Here the wildcard (*) always matches any attribute values.

Progressing through the looping logic 704 produces the first row for each user.

| User ID | Country | Job Code | Formula ID |
|---------|---------|----------|------------|
| Amy     | USA     | J2       | 2          |
| Bob     | Canada  | J1       | 3          |
| Cathy   | UK      | J3       | 7          |
| Dan     | China   | J1       | 5          |

This is the table updated with the assigned formula ID as shown at 706.

As further shown at 706, the allocation may then be calculated by looking up the staging table to find the default percent. For each of the above staging rows, the cost is calculated by using the previously calculated BASE multiplied by the default percent.

A batch update of the staging table produces the following calculated result.

| User ID | BASE (USD) | Default % | Cost(USD) | Formula ID |
|---------|------------|-----------|-----------|------------|
| Amy     | 40,000     | 5.0       | 2,000     | 2          |
| Bob     | 32,000     | 4.0       | 1,280     | 3          |
| Cathy   | 42,000     | 2.0       | 840       | 7          |
| Dan     | 35,000     | 3.0       | 1,050     | 5          |

Again, the allocated per-user cost results from applying the guideline formula to the fixed base salary data. Accordingly, the results can be altered in a relatively simple and efficient manner by re-assigning guideline formulas to the users in the staging table. Such model exploration is depicted in the screenshots of the example discussed below.

EXAMPLE

An example of compensation modeling is now provided in the context of storage and management of employment data by the Employee Central (EC) HRM system that is available from SuccessFactors, Inc., a subsidiary of SAP SE of Walldorf, Germany. In particular, a user in the human resources department of an entity accesses this EC platform in order to access stored employment data, and to update that stored data where appropriate.

Figure 8:
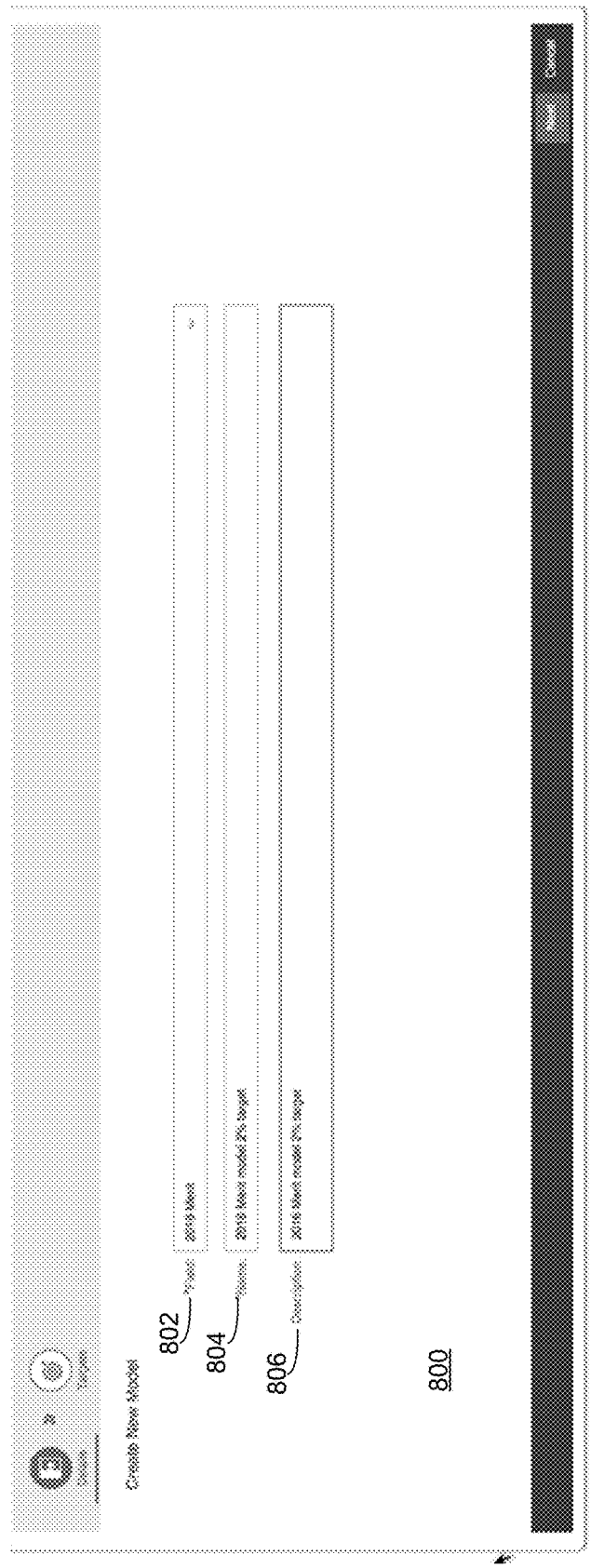
FIGS. 8-19A show various screenshots of an embodiment of an interface for employee compensation modeling according to an example.

FIG. 8 shows a screenshot of an initial interface screen 800, wherein a user may create a new model. The screen allows defining the new model by entering the field information 802, thereby providing a link with the underlying template. Here the template field comprises "merit" and the year 2016, indicating the modeling of merit-based compensation for the 2016 time frame.

The screen 800 further allows the user to input a formal name 804 for the model being created, together with textual description 806 of the new model. Here, this description indicates a specific percentage basis for the merit based compensation. That is, merit based compensation for all employees is to be 2% of the total compensation package for all employees.

Figure 9:
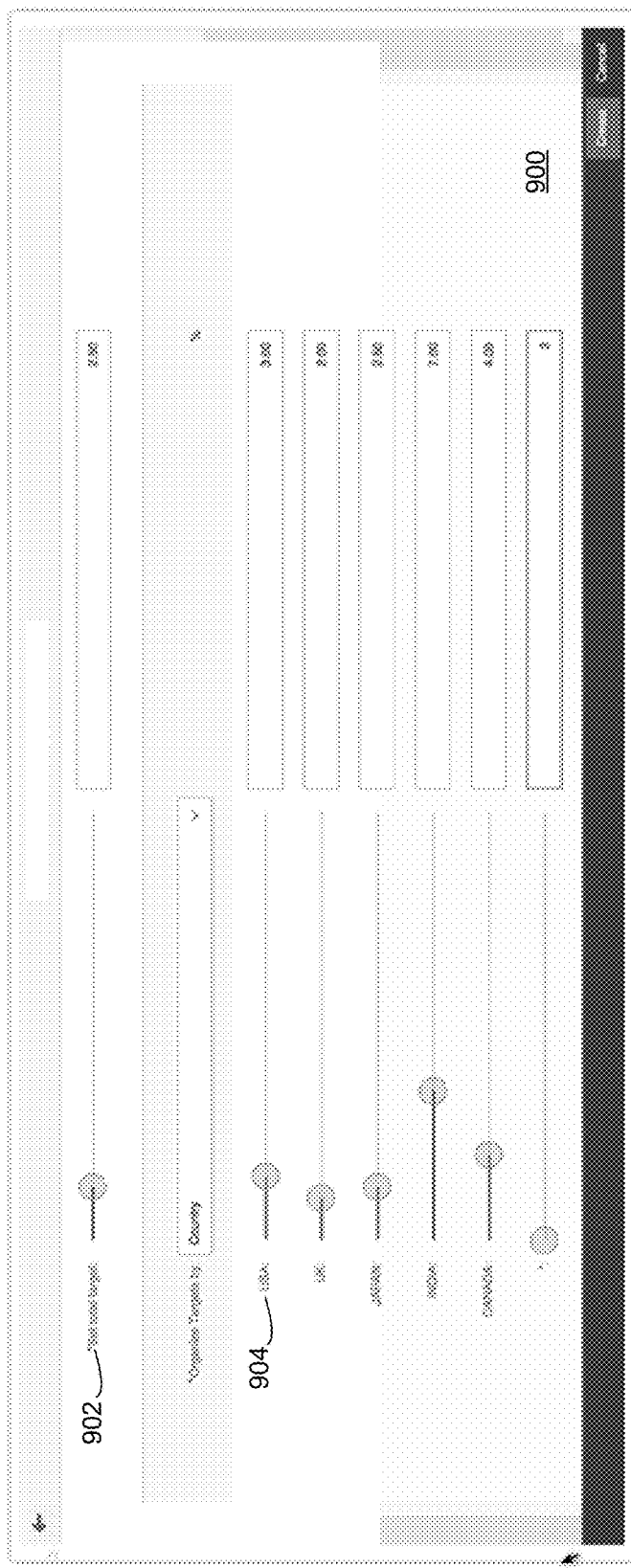

FIG. 9 shows another screenshot 900 allowing the modeler to create the target to which the model will be compared. Here, a slider mechanism allows the modeler to set a total target 902 of 2.5% of the total compensation package for all employees.

Moreover, the target further includes individual attributes shared with the model, allowing the modeler to set individual targets 904. Here screen 900 shows the target attribute of "country". Individual per-country target attributes of 3% (USA), 2% (UK), 2.5% (JAPAN), 7% (INDIA), 4% (CANADA), 3% (wild card) are specified, as related to the model attributes available in the staging table.

Figure 10:

The next screen of FIG. 10 is a modeling home page 1000 resulting from selection of the field in the screen of FIG. 8. This home page shows six different models based upon the "merit" field, each model having different assumptions reflected by the guideline formulas assigned to the staging table.

Figure 11:
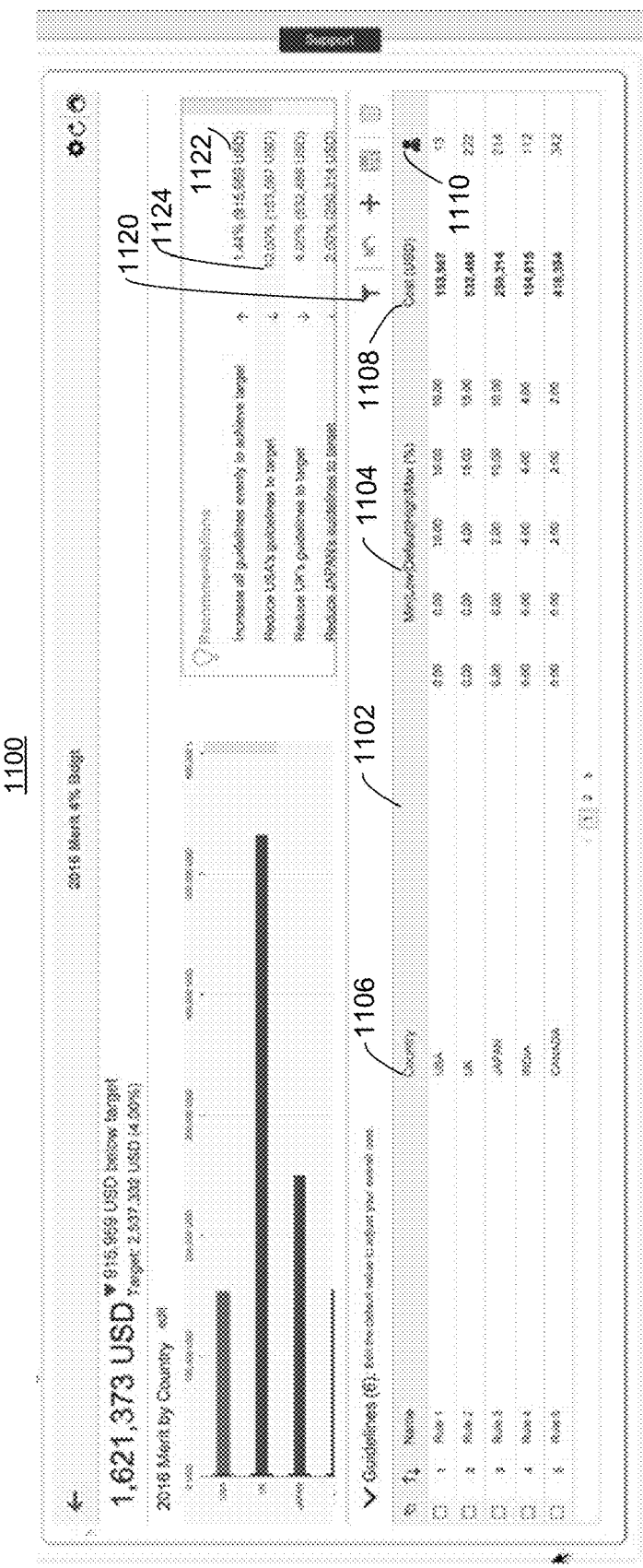

For example, screen 1100 of FIG. 11 shows the result of selecting the particular "2016 Merit 4% Bdgt" model highlighted in FIG. 10. This specific compensation model has a total allocated cost of $1,621,373.

The screenshot of FIG. 11 shows a detailed view of that model, including the guidelines represented by the guideline formulas. Here, table 1102 shows the percentage values for the range attribute 1104 (i.e., Min/Low/Default/High/Max) taken over values of the Country attribute 1106. The table further shows the per-guideline formula allocation 1108, and per-guideline formula count 1110.

The top left of the detailed model view in the screenshot of FIG. 11 shows a graphical representation (here a horizontal bar chart) of the breakdown of the total cost by an attribute (e.g., Country), mirroring the per-GL formula cost column of the table 1102.

The top right of the detailed model view in the screenshot of FIG. 11 also shows system recommendations to align the guidelines and targets. Details regarding recommendation generation are discussed below.

Various visual affordances may enhance a user's quick appreciation of various facets of the compensation models. For example, the model may be depicted with color text (e.g., green 1122 for a guideline value below target, red 1124 for a guideline value above target), may further heighten a user's interaction with the model.

FIG. 11 shows only a few guideline formulas specifically applicable to the Country attribute. It is to be appreciated, however, that a model may feature many guideline formulas applicable over a plurality of different attributes.

Accordingly, a modeler may seek to apply a filter in order to appreciate the impact of particular guidelines on the model. Such filtering is shown in the screenshot of FIG. 12.

Figure 12:
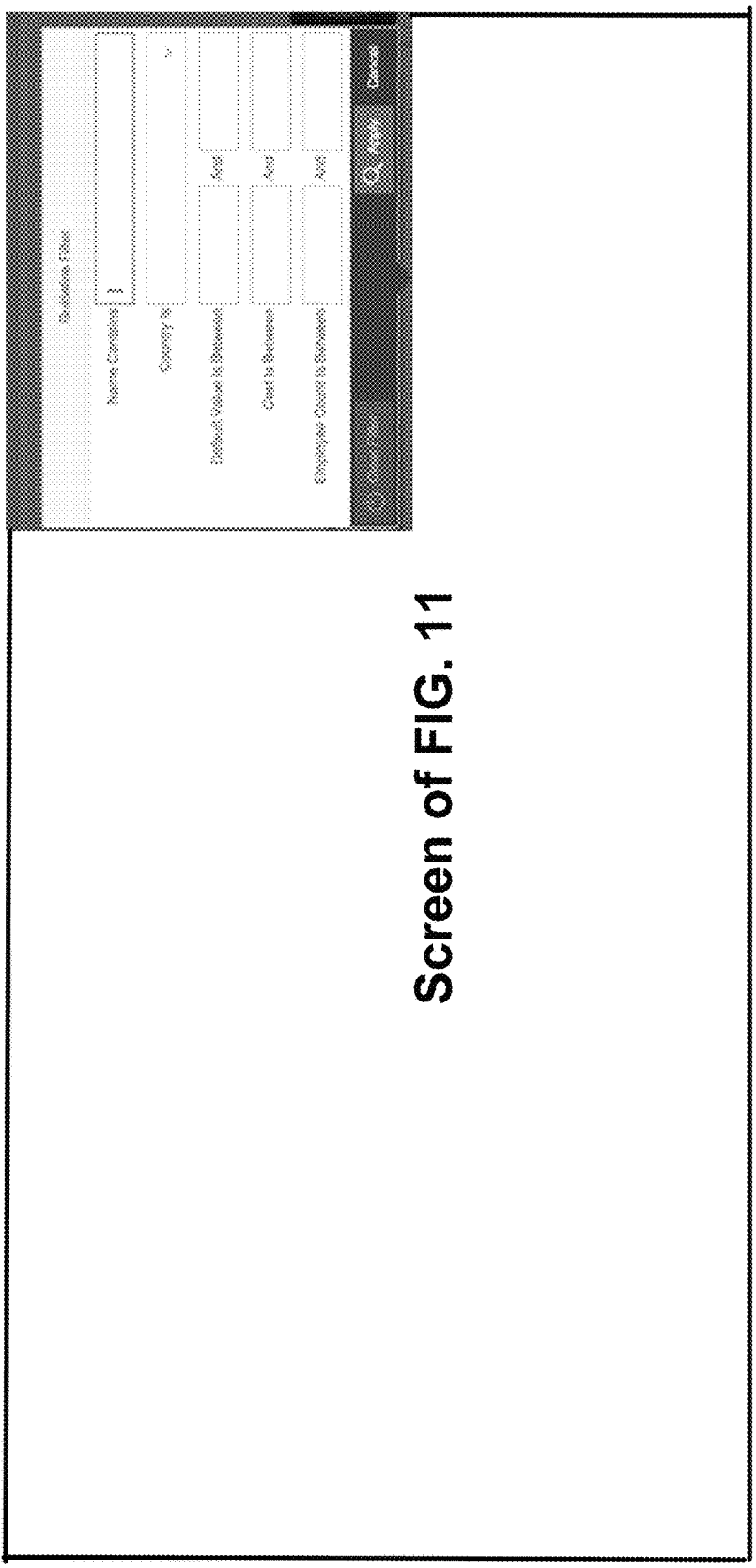

In particular, FIG. 12 shows a screen that may be accessed by clicking the filter icon 1120 of FIG. 11. This allows the user to specify display of only certain guidelines, e.g., those whose name contains particular text, those referencing a particular country as an attribute, those having a particular default range, etc.

It is noted that the order of execution of the guideline formulas can determine the resulting allocation. That is, the order of the guideline formulas from bottom to top determines the employee assignment to guidelines, and therefore, the allocated cost of each guideline formula. Accordingly, the interface allows a modeler to change an order of the guideline formulas.

Figure 13:
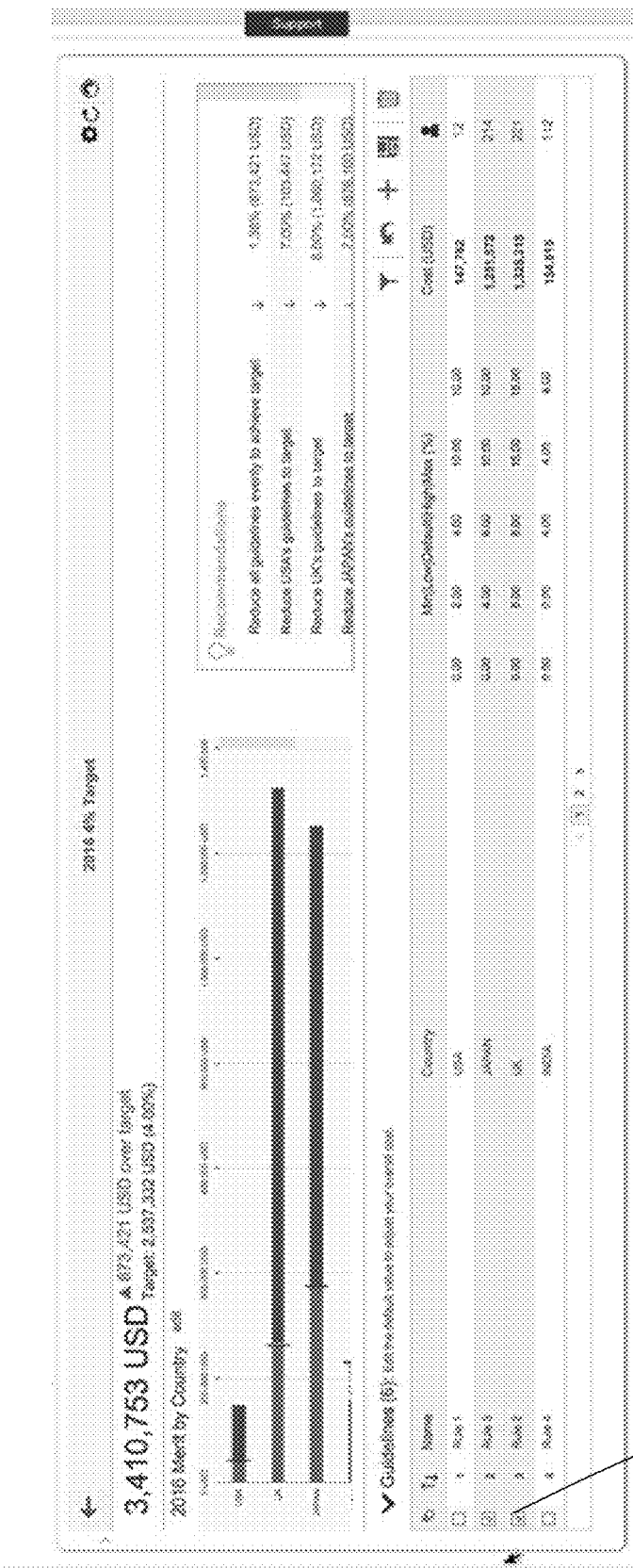

This changing of the order of guideline formulas is shown in the screenshot of FIG. 13 in connection with a different model: "2016 4% Target" having a total allocated cost of $3,410,753. Here, the modeler has selected boxes 1302 to exchange the order of the guideline formulas of JAPAN and the UK.

Figure 14:
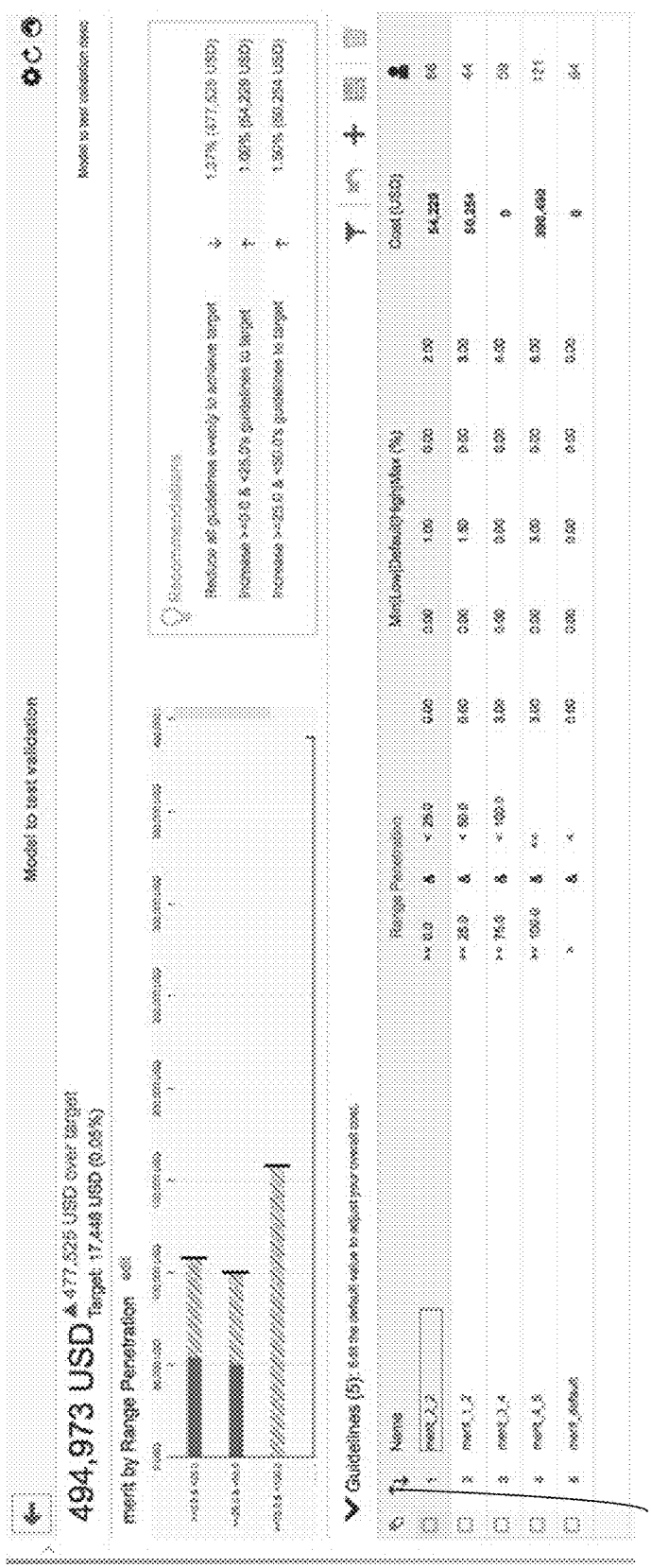
Figure 15:
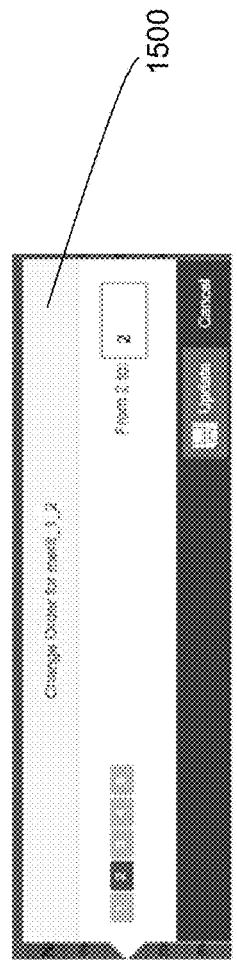

Changing of the order of guideline formulas is further shown in the screenshot of FIGS. 14-15 in connection with a different model: "Model to test validation" having a total allocated cost of $494,973. Here, when the user selects the "reorder" arrows 1402 a popup 1500 is invoked that allows the order of guideline formulas to be changed.

Figure 16:
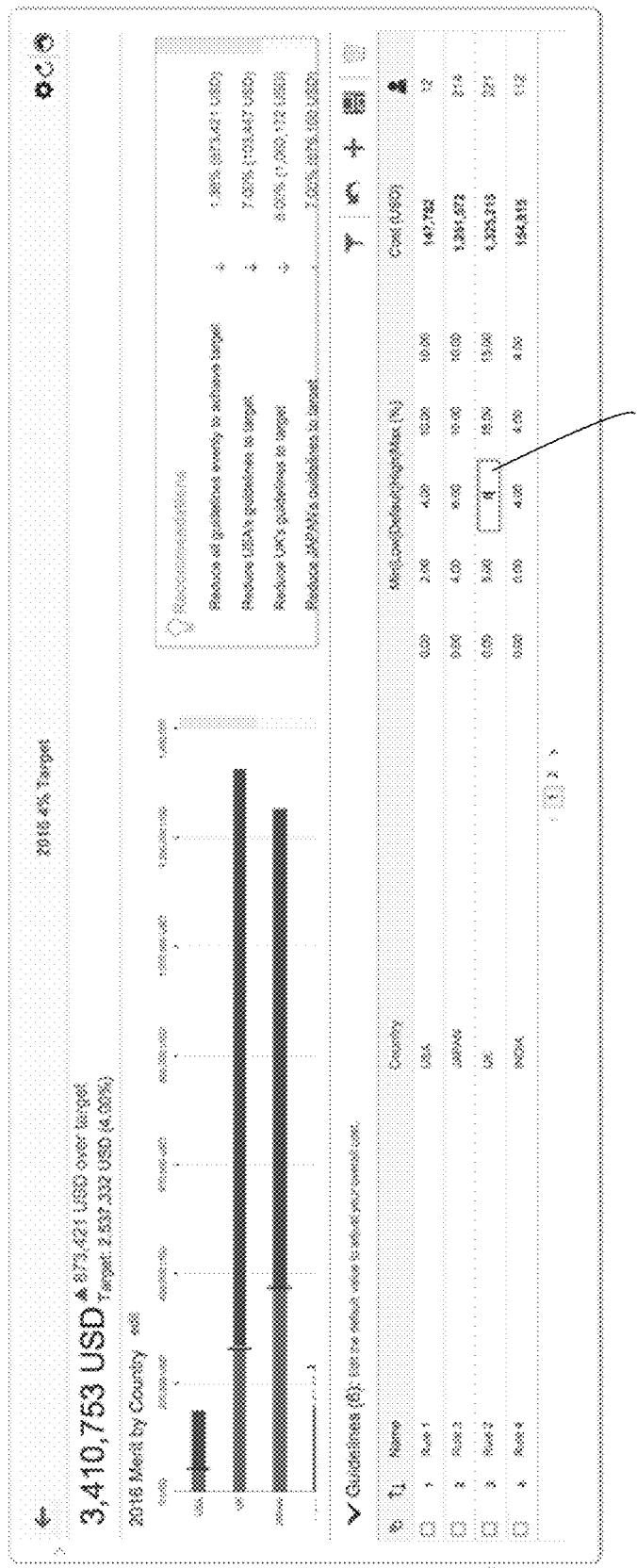

Returning to the "2016 4% Target" ($3,410,753) model of FIG. 13, a modeler may click on a value in the guideline matrix of the table in order to change the amount or percent. For example as shown in the screen shot of FIG. 16, a default value 1602 (for the UK) in the table may be accessed and changed. Upon selecting a save button (e.g., diskette icon), the allocated cost of the guideline formula will be synchronously re-calculated, rapidly providing updated new information to the user.

Figure 17:
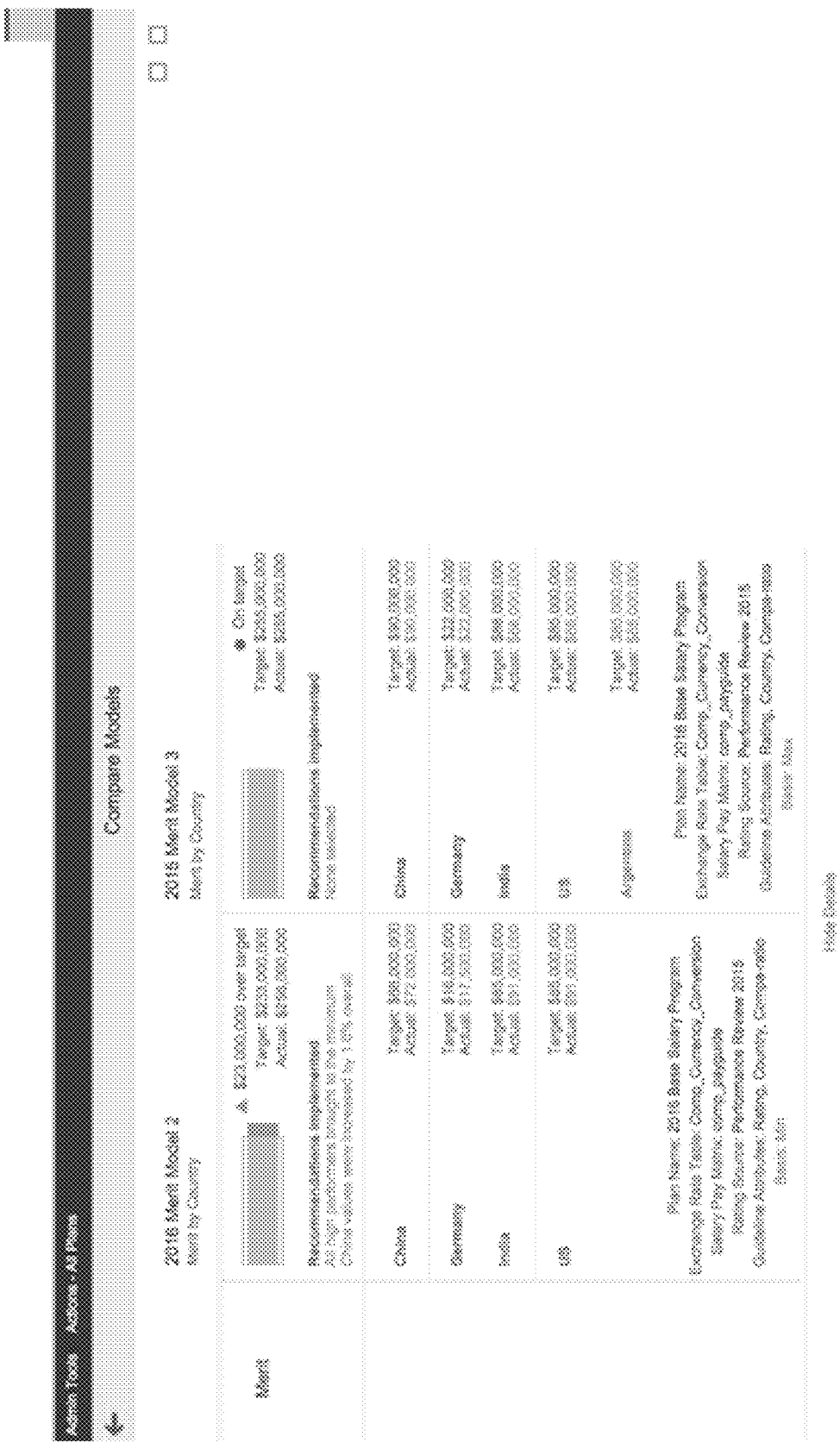

An interface according to embodiments may allow a user to select multiple models in order to perform a side-by-side comparison. This is shown in the screenshot of FIG. 17, where two different models created based upon the template merit field, are compared.

Figure 18:
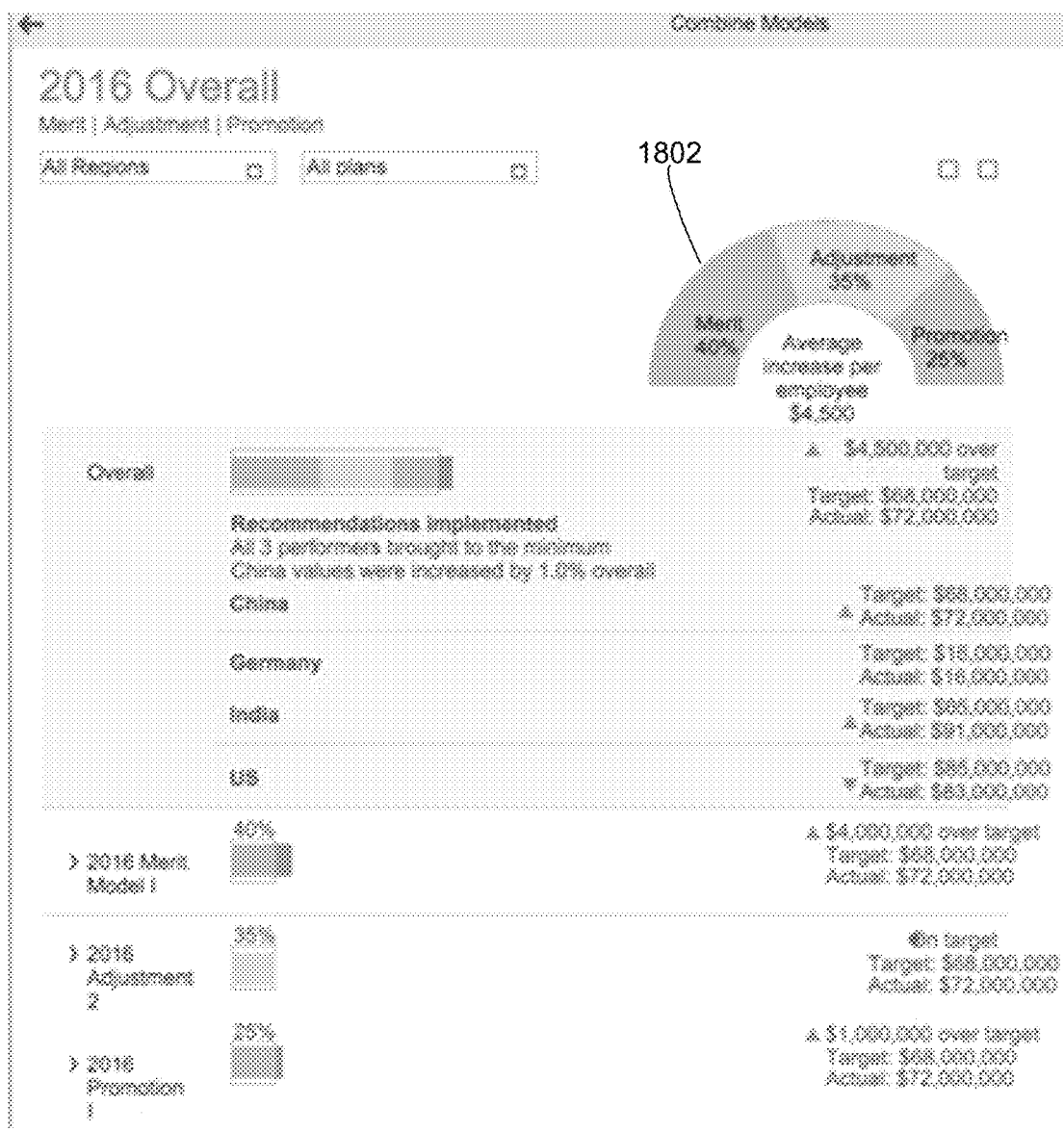

Embodiments may allow different compensation models to be combined on the screen, allowing the modeler to assess the total cost of compensation programs. This is shown in the screenshot of FIG. 18. Here, three (3) models based upon different template fields (i.e., Merit, Adjustment, Promotion) are shown combined, with the relative contributions of each afforded in a graphical representation 1802.

Figure 19:
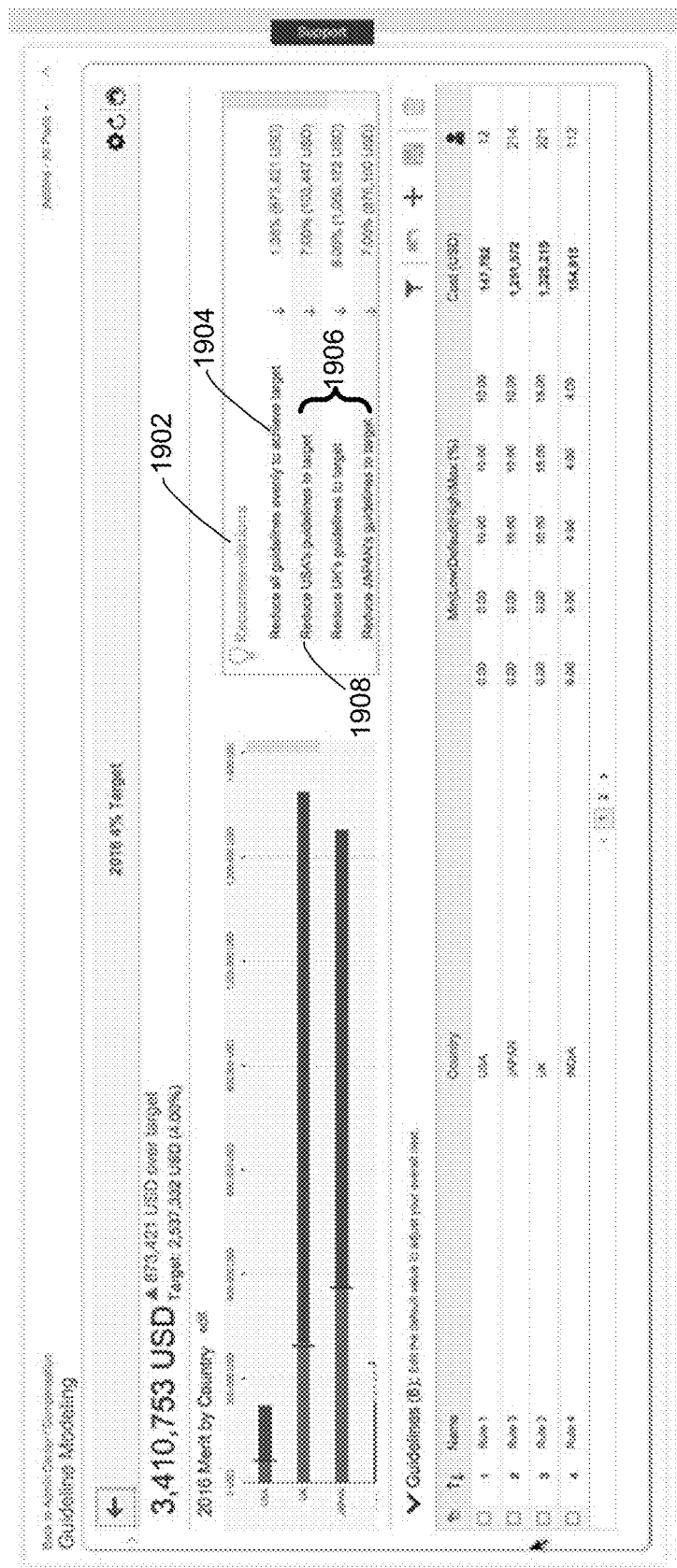

FIG. 19 returns to the detailed view of the "2016 4% Target" model. This screenshot shows a listing of recommendations 1902 suggested by the system, to bring the allocated cost of the model into line with the total cost of the target (e.g., budget). This is done by comparing cost allocations of the model with total and individual costs of the target.

Here, two types of recommendations are provided. A first recommendation type 1904 is to change the guideline formulas evenly to achieve the target. This involves:
1) calculating a difference D between the total cost of the target and the total allocated cost of the model;
2) identifying the number N of guideline formulas involving the attribute (e.g., Country) shared with the target;
3) dividing D/N to determine the total amount needed to be contributed by each guideline formula; and
4) adjusting the percentage in each of the N guideline formulas in order to achieve an allocation of D/N.

A second recommendation type 1906 is to change only one guideline formula to achieve the target. This involves:
1) calculating a difference D between an individual cost of the target and the total allocated cost of the model;
2) adjusting the percentage of only one guideline formula having a value of an attribute shared with the target (e.g., attribute=USA), in order to achieve a total allocation of D.

For example, reducing the USA's percentage contribution to total compensation from 10% to 3% (a difference of 7%) will result in a savings in compensation of $873,421. This allows the allocated cost of the model to meet to total cost target. Other recommendations in this set are also based upon comparing the total allocation with an individual target attribute cost.

Figure 19A:
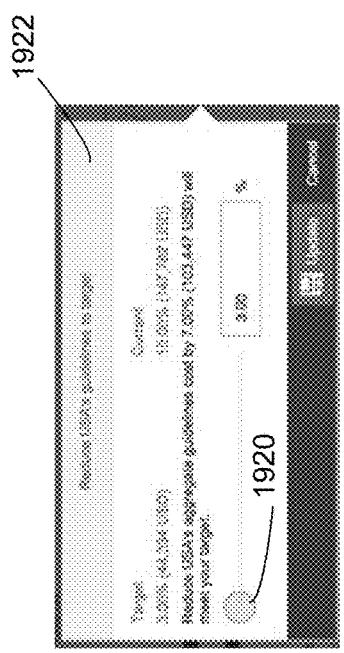

The screenshot of FIG. 19A shows that when the system recommendation 1908 is selected, the user may proceed with the amount recommended by the system, or change the amount to fund a budget holdback. Here, a budget holdback refers to an amount in the compensation model which is not allocated for specific goals. A modeler may usefully include such a budget holdback in order to accommodate issues that are unpredictable, unforeseen, and/or arise late in the course of the compensation modeling process.

In this particular embodiment, this amount may be changed by the use of a slider mechanism 1920. The pop-up box 1922 of FIG. 19A also provides the user with the ability to manually enter a specific amount.

It is noted that suggested recommendations vary according attribute(s) shared between the model and the target. For example, the set of recommendations offered in the model view of FIG. 19 reference the country attribute of the model (e.g., USA, UK, JAPAN). By contrast, the set of recommendations offered in the model view of FIG. 14 reference the range penetration attribute of the model.

Figure 20:
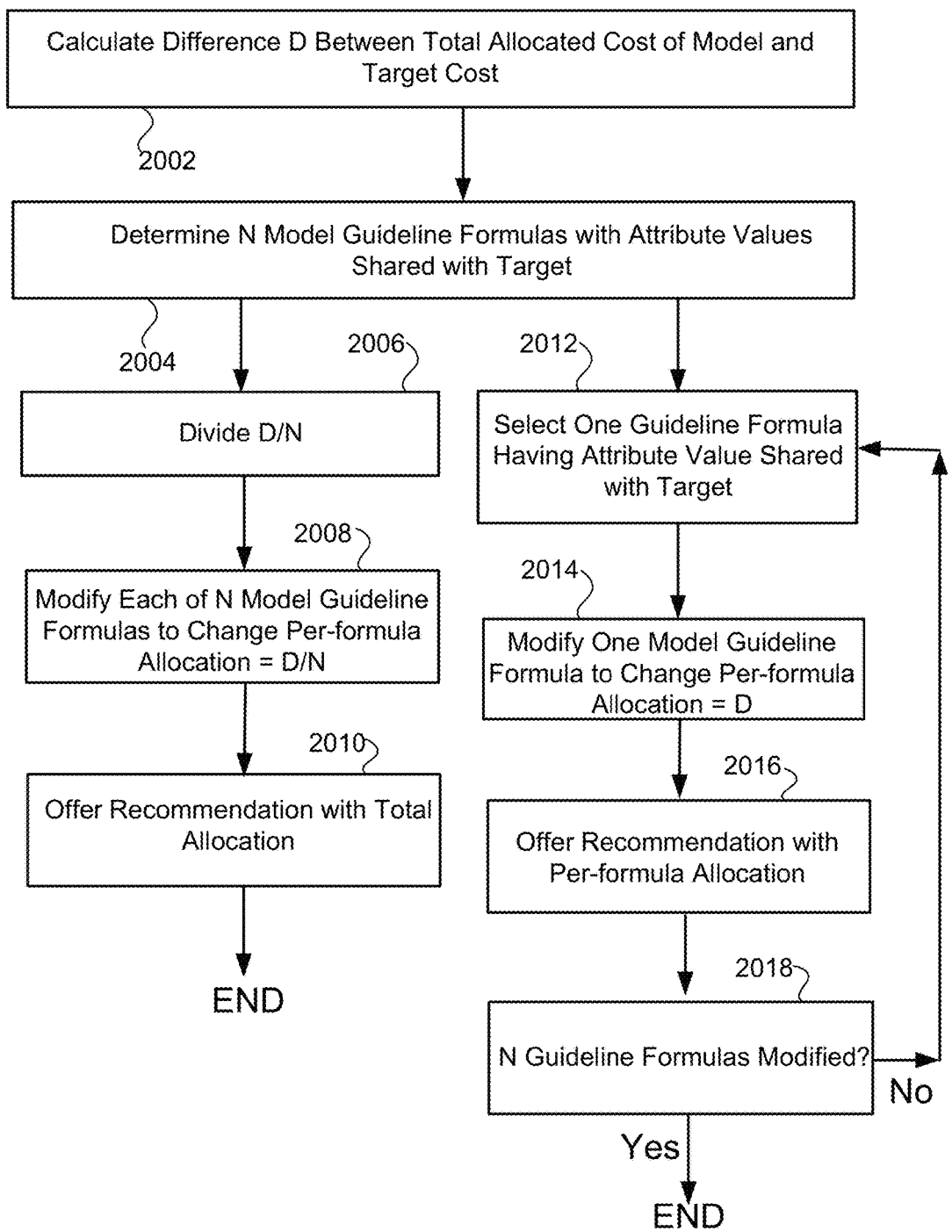
FIG. 20 is a simplified flow diagram illustrating generation of a recommendation according to an embodiment.

FIG. 20 is a simplified diagram illustrating a process 2000 of generating recommendations according to an embodiment. At 2002, a difference D between a total target cost and a total allocated cost of a model, is calculated.

At 2004, a number N of model guideline formulas sharing an attribute value (e.g., country name) with the target, is determined.

At 2006 of a first branch of the recommendation process flow, the difference D is divided by N. At 2008 of the process flow, each of the N model guideline formulas is modified to achieve a per-formula allocation of D/N. At 2010 a recommendation including the total allocation to change the N model guideline formulas is provided.

At 2012 of a second branch of the recommendation process flow, one of the N model guidelines formulas having an attribute value shared with the target, is selected. At 2014, the selected model guideline formulas is modified to achieve a per-formula allocation of D. At 2016, the recommendation for that selected model guideline formula is provided.

At 2018, the process flow iterates back to 2012 to select another of the N model guideline formulas having an attribute value shared with the target. That other model guideline formula is then modified to achieve a per-formula allocation of D, and the second recommendation is provided. This loop proceeds until recommendations have been offered for the N model guideline formulas.

Once a modeler is satisfied with the model, the modeler may decide to publish it to the template layer to serve as a basis for a compensation plan. This publication happens when a modeler has worked on a model, run the model, found the model to agree with desired targets, and then decided to push the model configuration back to the parent compensation plan template.

Figure 21:
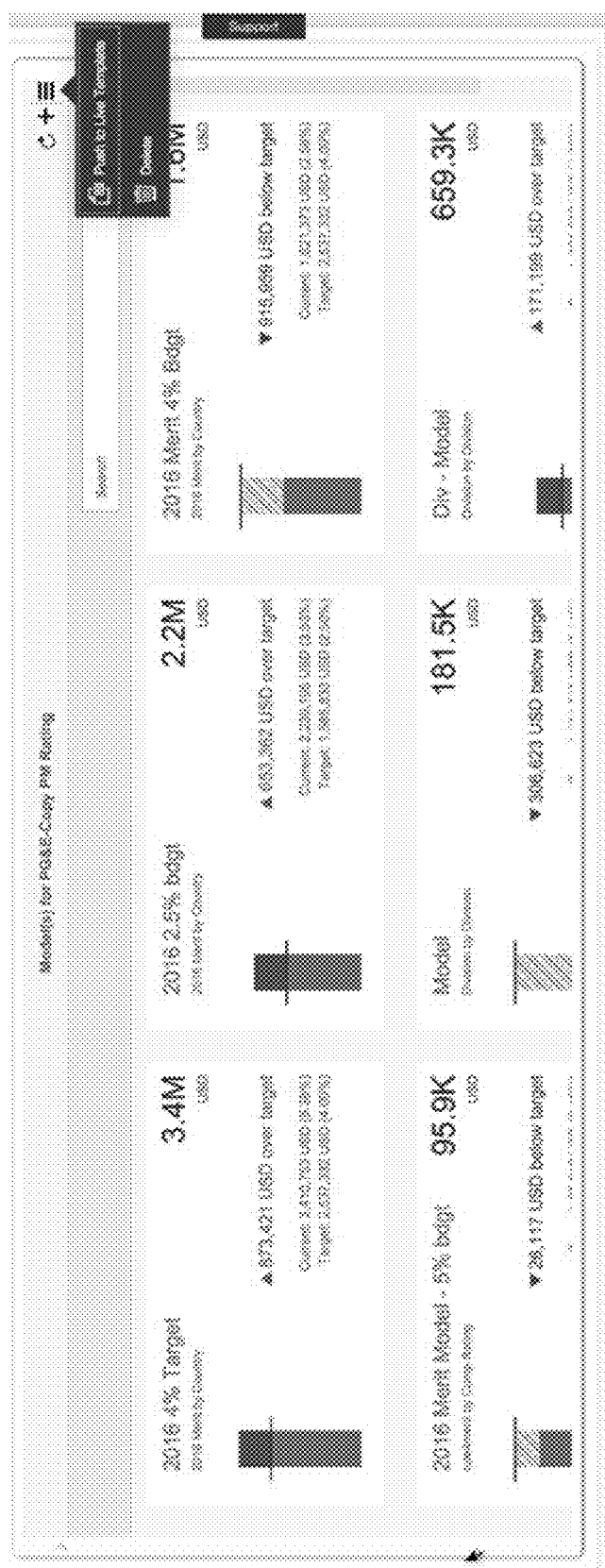

As shown in the screenshot of FIG. 21, the user may choose the optimal model, and select "Push to Live Template". This action pushes the model guideline formulas to the parent template, publishing it to serve as a basis for a compensation plan.

Figure 22:
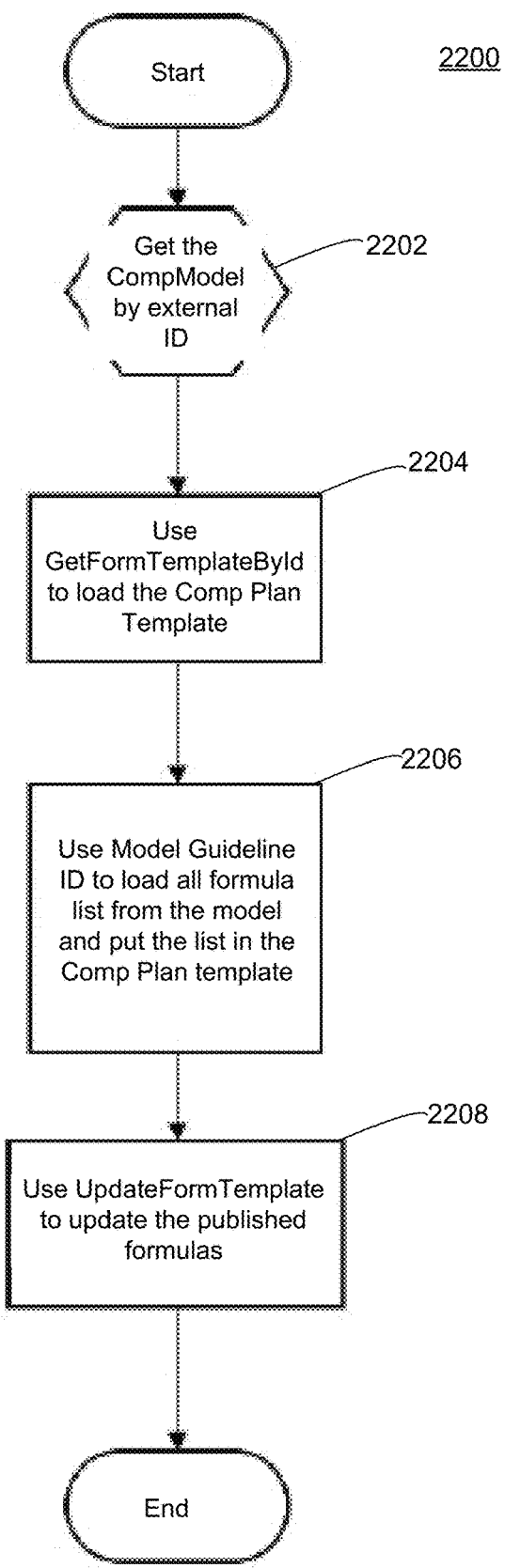
FIG. 22 is a simplified flow diagram illustrating publication of a model to a template.

FIG. 22 is a simplified diagram of a flow 2200 illustrating publication of a model to a template. At 2202, the particular compensation model sought to be published as a template, is obtained based upon its identifier (e.g., COMP_MODEL_GL_ID).

At 2204, the "GetFormTemplateById" command is used to load the parent template serving as the basis for the compensation model. At 2206, the Model Guideline ID is referenced to provide a list of all model guideline formulas into the parent compensation plan template.

At 2208, the "UpdateFormTemplate" command is used to update the parent template to include the formulas of the model.

As described herein, embodiments of compensation modelling may desirably impart valuable flexibility to accommodate a wide variety of use cases. For instance, some users may seek to model the cost of incorporating salary survey information on competitive market increases by country/industry/job classification.

Other customers may already have firm targets in place for the compensation model. Such targets can be based on a Works Council, a Union, and/or the Finance department, with modeling adhering to externally provided targets to allow the user to solve for guidelines.

Embodiments could allow users to gauge the impact of changing pay guides by a certain percentage (e.g., 1%), thereby reducing the position in range of user salaries, or updating exchange rates to reflect a stronger dollar.

Embodiments render this generation and exploration of compensation models simple and intuitive. This may be accomplished utilizing a logical flow of interface screens, for example as described in the example.

Embodiments may recognize the sensitivity of the compensation information being modeled and restrict access. Thus a program administrator may create a new permission labeled "Compensation Plan Modeling". In the Compensation and Variable Pay section on a panel of the interface, the administrator may assign a permission to enforce access to modeling, with a target population assigned this permission. Instances with legacy permissions may not be able to access the modeling screens.

Accesses to the modeling setting may be via an icon within the plan template, from a compensation home page. If no models have yet been created, the user may go directly to a hover/popup which requests the certain information, e.g.
source plan;
name;
description; and/or
effective Date.

When Create is selected, the system copies the plan template, and may display a message indicating that a new model is being created.

Under some circumstances, models may have already been created. There, the system brings the user to a modeling landing page with relevant details.

The system calculates a cost of the model. The system creates a model by applying the current eligible population to the source plan attributes for exchange rate, pay guide, performance rating source, and one or more guideline attributes.

The system may use the existing field mapping scheme in the source plan template, based on the component being modeled.

The system may convert salaries to the selected functional currency, using the exchange rate table selected.

If a base salary program is being modeled, the system may apply the guidelines from the source plan template to each employee's current salary, based on the relevant guideline.

If a stock program is being modeled, the system may calculate the number of shares or share value by applying the source plan template guidelines to each employee.

If the individual section of a bonus program is being modeled, the system may apply the relevant guideline in the source template to each employees' target payout amount for individual contribution.

If the team section of a bonus program is being modeled, the system may apply the relevant guideline in the source template to each employees' target payout amount for team contribution.

From a list of available attributes used in the source template, a user may select one or more of the following:
the guideline attribute to use for the row;
the guideline attribute to use for the column;
the guideline attribute(s) to use for the grouping.

According to certain embodiments, the system can use the first three guideline attributes that are identified in the source plan template.

The user may be able to view one or more of the following pieces of information about the model:
model name;
type;
status;
target;
actual result.

The user may be able to perform one or more of the following actions on the model:
set target,
print;
copy;
export guidelines.

A user may be able to filter models by status (e.g., Active, Inactive, or All.) A user may be able to filter models by type.

A user may set budget targets for guidelines. If "Set Target" is selected, the user may view a screen where targets can be set by amount or percent.

The user may be allowed to enter either the amount or percent for each guideline attribute value.

The user may enter either an overall target amount, or a target amount for each guideline attribute value.

Once a target is set, the overall target amount may be displayed in the model description.

To generate a model, the user can access a model setup page. From the model landing page, the user may be able to view and edit the one or more of the following pieces of setup information:

component being modeled (merit, promotion, adjustment, lump sum, individual bonus, team bonus, base salary, stock, Restricted Stock Unit-RSU, bonus, custom field);
model name;
description;
source plan template;
program type to be modeled: choices may include merit, promotion, adjustment, base salary, stock, individual bonus, team bonus;
a custom Field;
modeling functional currency;
exchange rate table;
pay guide;
rating scale;
data source (Employee Central, Import).

Where import is selected, the user may be prompted to enter the following values: import Key for program to be modeled; frequency; pay type.

In certain embodiments the user may select a performance rating source. The compensation modeling application may reference a form for this purpose.

Model attributes and settings may be displayed to a user. Examples can include the cost in functional currency of each set of guidelines, warnings and areas that require attention such as guidelines exceeding target and employees below the range. The user may select a widget to change the attributes.

In certain embodiments the user views a guideline matrix. The user can (optionally) select a guideline grouping to view the guideline values. In each matrix cell, system may display the guideline value default.

The user may click on the displayed value, and the system will show the min, default, and max values in editable format (if range has been selected). The user may edit the values, and click out of the cell to return to view mode.

The system may display an aggregate salary amount associated with a cell. The user may switch the guidelines between grid view and list view, with the list view determining processing order. This is illustrated further in the example below.

A user may access a setting to adjust various guideline values. A user may print the guideline matrix, and/or export the guideline matrix in particular formats.

In certain embodiments the system may display matrix cells with background user interface indicating the relative amount of the guideline value. The user may select a setting to adjust values in all cells. The user may select a gear widget to change the row and column attributes.

Embodiments allow the user to access graphical view(s) of the model results. The user may view the results of the model, based on the attributes selected. Particular examples can include but are not limited to:
viewing average increase by country, by performance rating;
viewing average increase by country, by position in range;
viewing average increase by country, by comparing ratio;
viewing average increase by country, by budget group;
viewing total cost by country.

The user may compare/aggregate models. Selecting "Compare" allows two models to be displayed side-by-side (e.g., FIG. 17). Selecting "Combine" allows two or more models to be aggregated (FIG. 18).

Figure 23:
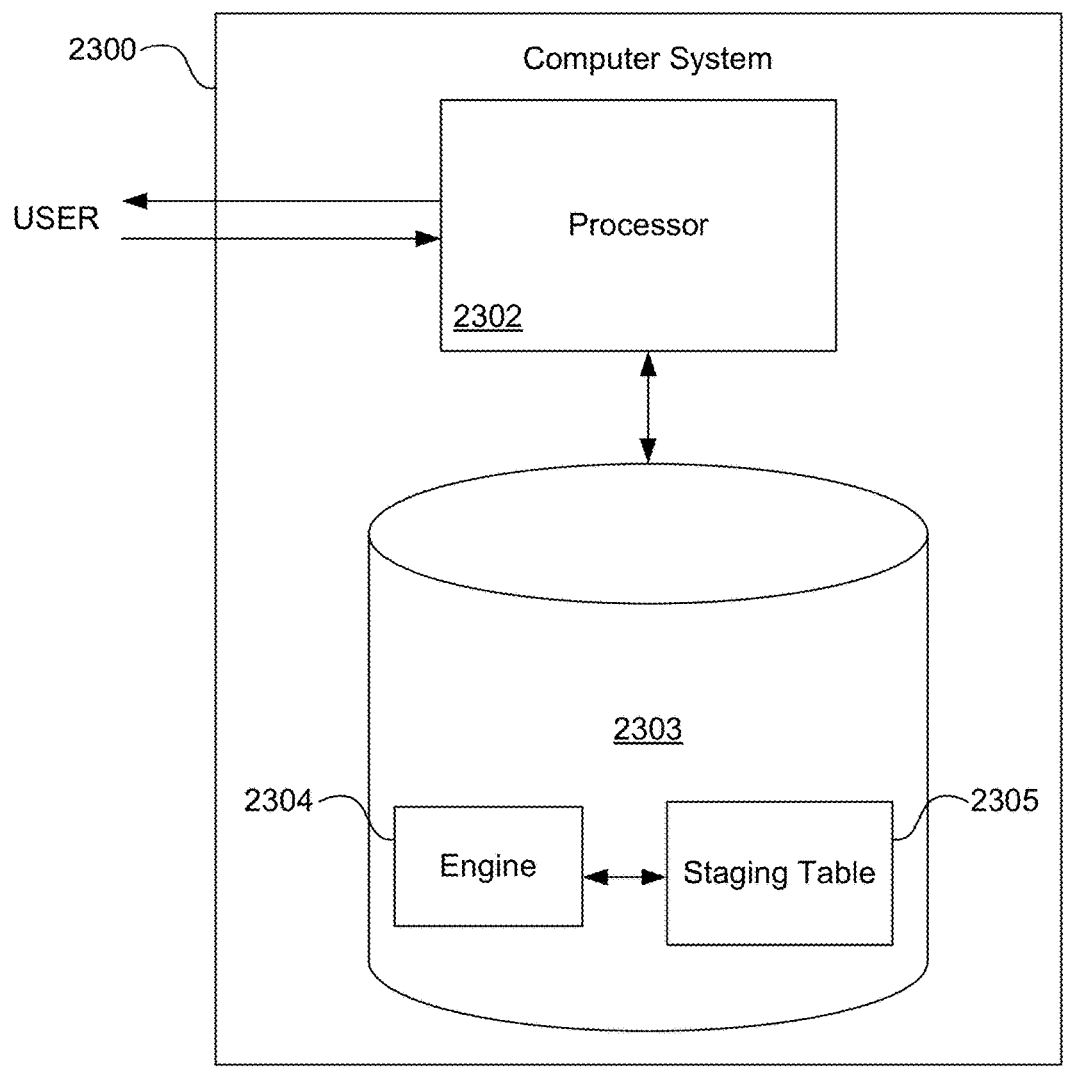
FIG. 23 illustrates hardware of a special purpose computing machine configured to provide employee compensation modeling according to an embodiment.

FIG. 23 illustrates hardware of a special purpose computing machine configured to provide employee compensation modeling according to an embodiment. In particular, computer system 2300 comprises a processor 2302 that is in electronic communication with a non-transitory computer-readable storage medium 2303. This computer-readable storage medium has stored thereon code 2305 corresponding to a staging table. Code 2304 corresponds to an engine. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

It is noted that in the specific embodiment of FIG. 23, the modeling engine is shown as being part of a database. Such an embodiment can correspond to applications performing processing by a powerful engine available as part of an in-memory database implemented in Random Access Memory (RAM), e.g., the HANA in-memory database available from SAP SE of Walldorf, Germany. However, this not required and in certain embodiments (e.g., that shown in FIG. 1) the modeling engine may be implemented in other ways, for example as part of an overlying application layer.

Figure 24:
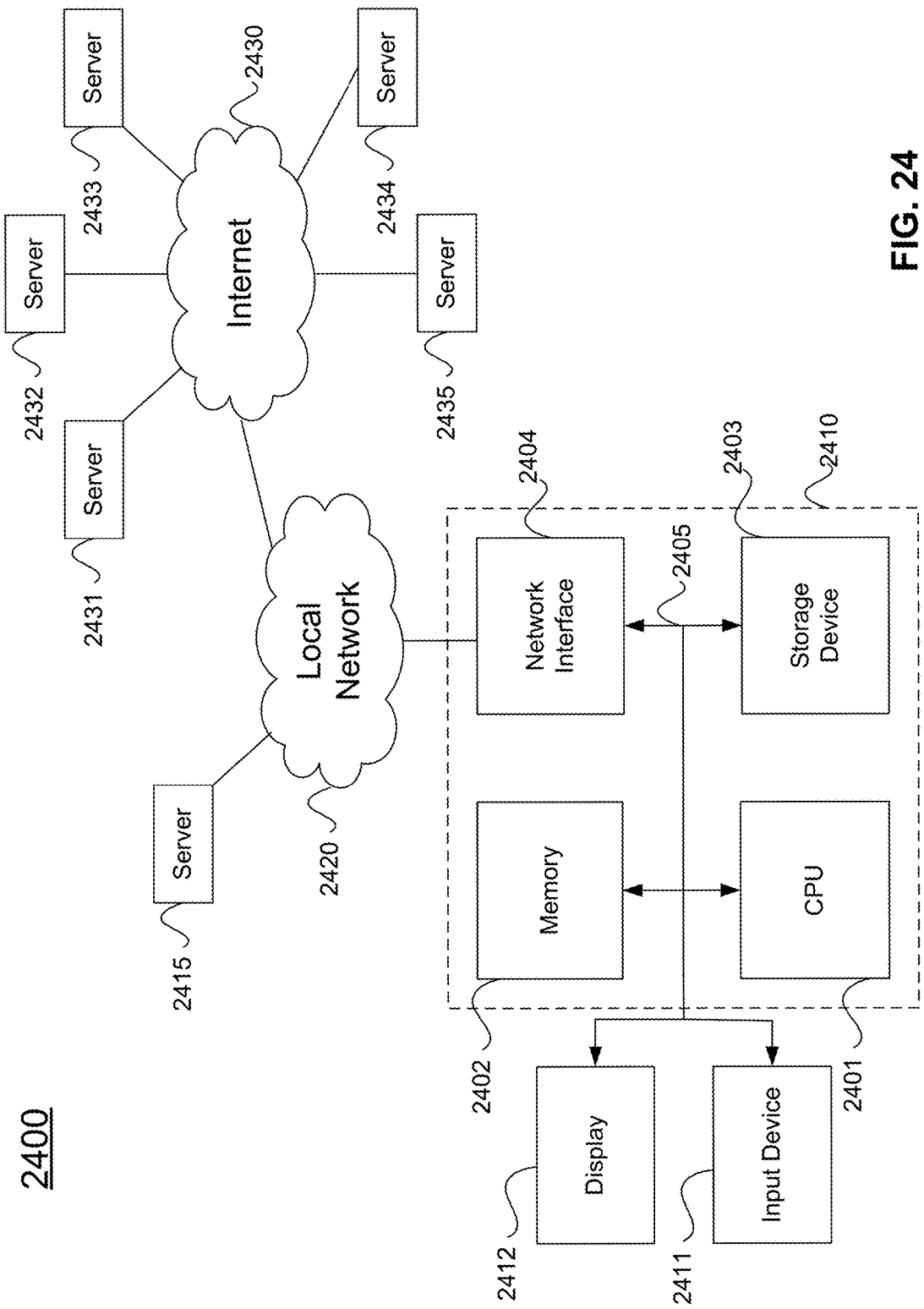
FIG. 24 illustrates an example computer system.

An example computer system 2400 is illustrated in FIG. 24. Computer system 2410 includes a bus 2405 or other communication mechanism for communicating information, and a processor 2401 coupled with bus 2405 for processing information. Computer system 2410 also includes a memory 2402 coupled to bus 2405 for storing information and instructions to be executed by processor 2401, including information and instructions for performing the techniques described above, for example. This memory may also be used for storing variables or other intermediate information during execution of instructions to be executed by processor 2401. Possible implementations of this memory may be, but are not limited to, random access memory (RAM), read only memory (ROM), or both. A storage device 2403 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 2403 may include source code, binary code, or software files for performing the techniques above, for example. Storage device and memory are both examples of computer readable mediums.

Computer system 2410 may be coupled via bus 2405 to a display 2412, such as a cathode ray tube (CRT) or liquid crystal display (LCD), for displaying information to a computer user. An input device 2411 such as a keyboard and/or mouse is coupled to bus 2405 for communicating information and command selections from the user to processor 2401. The combination of these components allows the user to communicate with the system. In some systems, bus 2405 may be divided into multiple specialized buses.

Computer system 2410 also includes a network interface 2404 coupled with bus 2405. Network interface 2404 may provide two-way data communication between computer system 2410 and the local network 2420. The network interface 2404 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 2404 sends and receives electrical, electromagnetic, or optical signals that carry digital data streams representing various types of information.

Computer system 2410 can send and receive information, including messages or other interface actions, through the network interface 2404 across a local network 2420, an Intranet, or the Internet 2430. For a local network, computer system 2410 may communicate with a plurality of other computer machines, such as server 2415. Accordingly, computer system 2410 and server computer systems represented by server 2415 may form a cloud computing network, which may be programmed with processes described herein. In the Internet example, software components or services may reside on multiple different computer systems 2410 or servers 2431-2435 across the network. The processes described above may be implemented on one or more servers, for example. A server 2431 may transmit actions or messages from one component, through Internet 2430, local network 2420, and network interface 2404 to a component on computer system 2410. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
providing an in-memory database comprising information of a plurality of users;
populating a staging entity of a model with a subset of the information comprising a per-user base value and per-user attribute values, wherein the staging entity is stored within the in-memory database, wherein the staging entity has a MetaData Framework (MDF) format and is based upon metadata provided by a class of a parent template in the in-memory database, the parent template having a format different than the MDF format;
based upon the per-user attribute values, assigning each user in the staging entity a respective guideline from a guideline table, wherein the assigning comprises performing a join operation between the staging entity and the guideline table;
applying the respective guideline to the per-user base value to generate a per-user allocation;
aggregating the per-user allocation for multiple users with the same guideline to create a per-guideline allocation, wherein the aggregating is performed by an in-memory database engine of the in-memory database;
displaying the per-guideline allocation;
in response to an input provided to the model, changing a value of the respective guideline of one of the users in the staging entity;
applying the respective guideline with the changed value to the per-user base value to generate a batch updated per-user allocation;
modifying the parent template to include the changed value;
storing the staging entity with the batch updated per-user allocation; and
displaying in an interface screen, the changed value of the model juxtaposed with a different model, the interface screen including,
a first string identifying a formal name of a table in the MDF format,
a second string identifying a formal name of a matrix in the MDF format, and
a third string identifying a ratio attribute, wherein at least one of the first string, the second string, and the third string are common between the model and the other model.

2. A computer-implemented method as in claim 1 further comprising:
aggregating the multiple users with the same respective guideline to create a per-guideline count; and
displaying the per-guideline count.

3. A computer-implemented method as in claim 1 wherein the input is made to the per-guideline allocation being displayed.

4. A computer-implemented method as in claim 1 further comprising:
aggregating the per-guideline allocation for multiple guidelines to create a total allocation.

5. A computer-implemented method as in claim 4 further comprising:
determining a difference between the total allocation and a target of a target entity; and
displaying the difference.

6. A computer-implemented method as in claim 5 wherein the target references the attribute value, the method further comprising:
generating a recommendation to change the model based upon the per-guideline allocation, wherein the input comprises an acceptance of the recommendation.

7. A computer-implemented method as in claim 6 wherein the recommendation is to change a plurality of respective guidelines evenly to produce the difference.

8. A computer-implemented method as in claim 1 wherein the staging entity is based upon metadata provided by a parent template, the method further comprising:
modifying the parent template to include the changed guideline value.

9. A computer-implemented method as in claim 1 wherein:
the engine of the in-memory database applies the respective guideline to the per-user base value to generate the per-user allocation.

10. A non-transitory computer readable storage medium embodying a computer program for performing a method, said method comprising:
providing an in-memory database comprising information of a plurality of users;
populating a staging entity of a model with a subset of the information comprising a per-user base value and per-user attribute values, wherein the staging entity is stored within the in-meory database, wherein the staging entity has a MetaData Framework (MDF) format and is based upon metadata provided by a class of a parent template in the in-memory database, the parent template having a format different than the MDF format;
based upon the attribute values, assigning each user in the staging entity a respective guideline from a guideline table, wherein the assigning comprises performing a join operation between the staging entity and the guideline table;

applying the respective guideline to the per-user base value to generate a per-user allocation;

aggregating the per-user allocation for multiple users with the same respective guideline to create a per-guideline allocation, wherein the aggregating is performed by an in-memory database engine of the in-memory database;

aggregating the multiple users with the same respective guideline to create a per-guideline count;

displaying the per-guideline allocation and the per-guideline count;

in response to an input provided to the model, changing a value of the respective guideline of one of the users in the staging entity;

applying the respective guideline with the changed value to the per-user base value to generate a batch updated per-user allocation;

modifying the parent template to include the changed value;

storing the staging entity with the batch updated per-user allocation;

aggregating the per-user allocation for multiple users with the same respective guideline to create a per-guideline allocation;

displaying the per-guideline allocation; and displaying in an interface screen, the changed value of the model juxtaposed with a different model, the interface screen including,
  a first string identifying a formal name of a table in the MDF format,
  a second string identifying a formal name of a matrix in the MDF format, and
  a third string identifying a ratio attribute, wherein at least one of the first string, the second string, and the third string are common between the model and the other model.

11. A non-transitory computer readable storage medium as in claim 10 wherein the method further comprises:
  determining a difference between the total allocation and a target of a target entity; and
  generating a recommendation to change the model based upon the per-guideline allocation, wherein the input comprises an acceptance of the recommendation.

12. A non-transitory computer readable storage medium as in claim 11 wherein the recommendation is to change a plurality of respective guidelines evenly to produce the difference.

13. A non-transitory computer readable storage medium as in claim 11 wherein the recommendation is to change one of the plurality of respective guidelines to produce the difference.

14. A computer system comprising:
  one or more processors;
  a software program, executable on said computer system, the software program configured to cause an in-memory database engine to:
    provide an in-memory database comprising information of a plurality of users;
    populate a staging entity of a model with a subset of the information comprising a per-user base value and per-user attribute values, wherein the staging entity has a MetaData Framework (MDF) format and is based upon metadata provided by a class of a parent template in the in-memory database, the parent template having a format different than the MDF format;
    store the staging entity in the in-memory database;
    based upon the attribute values, assign each user in the staging entity a respective guideline from a guideline table, wherein the assigning comprises performing a join operation between the staging entity and the guideline table;
    apply the respective guideline to the per-user base value to generate a per-user allocation;
    in response to an input provided to the model, change a value of the respective guideline of one of the users in the staging entity;
    apply the respective guideline with the changed value to the per-user base value to generate a batch updated per-user allocation;
    modify the parent template to include the changed value;
    store the staging entity with the batch updated per-user allocation; and
    display in an interface screen, the changed value of the model juxtaposed with a different model, the interface screen including,
      a first string identifying a formal name of a table in the MDF format,
      a second string identifying a formal name of a matrix in the MDF format, and
      a third string identifying a ratio attribute, wherein at least one of the first string, the second string, and the third string are common between the model and the other model.

15. A computer system as in claim 14 wherein the in-memory database engine is further configured to aggregate the per-guideline allocation for multiple guidelines to create a total allocation.

16. A computer system as in claim 15 wherein the in-memory database engine is further configured to determine a difference between the total allocation and a target of a target entity; and
  generate a recommendation to change the model based upon the per-guideline allocation, wherein the input comprises an acceptance of the recommendation.

17. A computer system as in claim 14 wherein the in-memory database engine is further configured to determine the per-user base value from per-user data stored in the staging table.

* * * * *